US006921575B2

(12) United States Patent
Horiuchi et al.

(10) Patent No.: US 6,921,575 B2
(45) Date of Patent: Jul. 26, 2005

(54) CARBON NANOTUBE STRUCTURES, CARBON NANOTUBE DEVICES USING THE SAME AND METHOD FOR MANUFACTURING CARBON NANOTUBE STRUCTURES

(75) Inventors: Kazunaga Horiuchi, Minamiashigara (JP); Masaaki Shimizu, Nakai-machi (JP); Hisae Yoshizawa, Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 241 days.

(21) Appl. No.: 10/014,560

(22) Filed: Dec. 14, 2001

(65) Prior Publication Data

US 2002/0172639 A1 Nov. 21, 2002

(30) Foreign Application Priority Data

May 21, 2001 (JP) ...................................... 2001-150904

(51) Int. Cl.$^7$ ................................................ D01F 9/12
(52) U.S. Cl. ........................ 428/367; 257/776; 361/751
(58) Field of Search ............................ 428/367; 438/20, 438/962; 313/235; 257/776; 361/751

(56) References Cited

U.S. PATENT DOCUMENTS 6,440,761 B1 * 8/2002 Choi ............................ 438/20

FOREIGN PATENT DOCUMENTS

WO    WO 89/07163    8/1989

OTHER PUBLICATIONS

Zhang et al. 'Elastic Response of Carbon Nanotubes Bundles to Visible Light' in Physical Review Letters vol. 82 No. 17 pp. 3472–3475, Apr. 26, 1999.*

Walt A. de Heer et al., "A Carbon Nanotube Field–Emission Electron Source", SCIENCE, vol. 270, Nov. 17, 1995 pp. 1179–1180.

A. G. Rinzler et al., "Unraveling Nanotubes: Field Emission from an Atomic Wire", SCIENCE, vol. 269, Sep. 15, 1995, pp. 1550–1553.

H. Dai et al., "Nanotubes as nanoprobes in scanning probe microscopy", NATURE, vol. 384, Nov. 14, 1996, pp. 147–150.

A. C. Dillon et al., "Storage of hydrogen in single–walled carbon nanotubes", NATURE, vol. 386, Mar. 27, 1997, pp. 377–379.

H. Dai et al., "Single–wall nanotubes produced by metal–catalyzed disproportionation of carbon monoxide", Chemical Physics Letters, vol. 260, Sep. 27, 1996, pp. 471–475.

S. Iijima, "Helical microtubules of graphitic carbon", NATURE, vol. 354, Nov. 7, 1991, pp. 56–58.

T. W. Ebbesen et al., "Large–scale synthesis of carbon nanotubes", NATURE, vol. 358, Jul. 16, 1992, pp. 220–222.

(Continued)

*Primary Examiner*—Stuart Hendrickson
(74) *Attorney, Agent, or Firm*—Oliff & Berridge, PLC

(57) ABSTRACT

Carbon nanotube structures are provided, in which the networks with a desired area and volume, where the carbon nanotubes are electrically or magnetically connected, are formed and the method for easily manufacturing the carbon nanotube structures with less carbon nanotube structures. Carbon nanotube devices are also provided, to which the useful carbon nanotube structures mentioned above are applied. A method for manufacturing carbon nanotube structures includes the steps of applying carbon nanotubes to a low-viscosity dispersion medium to obtain a high-viscosity dispersing liquid which includes carbon nanotubes, and forming a network of the carbon nanotubes having electrical and/or magnetic connections therebetween by removing the low-viscosity dispersion medium from the high-viscosity dispersed liquid.

6 Claims, 13 Drawing Sheets

OTHER PUBLICATIONS

T. Güo et al., "Catalytic growth of single–walled nanotubes by laser vaporization", Chemical Physics Letters, vol. 243, Sep. 8, 1995, pp. 49–54.

A. Thess et al., "Crystalline Ropes of Metallic Carbon Nanotubes", SCIENCE, vol. 273, Jul. 26, 1996, pp. 483–487.

A. Bachtold et al., "Aharonov–Bohm oscillations in carbon nanotubes", NATURE, vol. 397, Feb. 25, 1999, pp. 673–675.

M. Freitag et al., "Local electronic properties of single–wall nanotube circuits measured by conducting–tip AFM", Physical Review B, vol. 62, No. 4, Jul. 15, 2000, pp. R2307–R2310.

* cited by examiner

CARBON NANOTUBE STRUCTURES, CARBON NANOTUBE DEVICES USING THE SAME AND METHOD FOR MANUFACTURING CARBON NANOTUBE STRUCTURES

BACKGROUND OF THE INVENTION

1. Field of the Invention

This invention relates to a method for manufacturing carbon nanotube structures applicable to devices which contain carbon nanotubes, functional materials, and other structural materials, to the carbon nanotube structures, and to carbon nanotube devices using them.

The invention can be extended to a wide variety of applications of carbon nanotubes.

2. Description of the Related Art

Fibrous carbons are generally called carbon fibers and conventionally, several kinds of methods for manufacturing carbon fibers having thickness of several $\mu$m or more in diameter used for structural materials have been studied. At present, among them, the method for manufacturing carbon fibers from PAN-based (polyacrylonitrile) and pitch-based materials is the most widely used.

The method is briefly described as such a method, by which materials spun out from the PAN-based, isotropic pitch-based, and mesophase pitch-based fibers are insolubilized, made flameproof, carbonized at 800 to 1400° C., and high-temperature treated at 1500 to 3000° C. Since the resulting carbon fibers not only have superior mechanical characteristics such as strength and elastic modulus but also are light weight, they are used for sporting goods, a heat-insulating material, a compound material for a structural material applicable to aerospace and automobile production.

Apart from this, the carbon nanotubes discovered recently are made of a tubular material with a thickness of 1 $\mu$m or smaller (in diameter). Ideally, a carbon face of a hexagon mesh forms a tube in parallel to an axis of the tube and plural tubes may be formed. It is theoretically estimated that the carbon nanotubes have either a metallic or semiconductor property depending on how carbon hexagon meshes are linked and the thickness of the tubes, allowing expectation that it will be a promising functional material.

Usually, to synthesize the carbon nanotubes, an arc discharge method is used and in addition, the methods including a laser evaporation method, a pyrolytic method, and a method using plasma have recently been studied. The carbon nanotubes recently developed are generally described below.

(Carbon Nanotube)

Finer than carbon fibers, the material with 1 $\mu$m or smaller of diameter is generally called carbon nanotubes and distinguished from the carbon fibers, although no clear line can be run between the both types of carbon fibers. By a narrow definition, the material, of which carbon faces with hexagon meshes are almost parallel to the axis of the tube, is called a carbon nanotube and even a variant of the carbon nanotube, around which amorphous carbon and metal or its catalyst surrounds, is included in the carbon nanotube. (Note that with respect to the present invention, this narrow definition is applied to the carbon nanotube.)

Usually, the narrowly-defined carbon nanotubes are further classified into two types: carbon nanotubes having a structure with a single hexagon mesh tube are called single wall nanotubes (hereafter, simply referred to as "SWNT"; the carbon nanotubes made of multi-layer hexagon mesh tubes are called multi-wall nanotubes (hereafter, simply referred to as "MWNT"). Type of carbon nanotubes may be determined depending on how to synthesize and the established conditions to some degree but production of purely one type of the carbon nanotubes has not yet been achieved.

The carbon fibers have larger diameters and incomplete cylindrical mesh structures parallel to the axes of the tubes. The carbon nanotubes produced by a vapor-phase pyrolysis method using a catalyst have a tubular mesh structure parallel to the axis of the tube in the vicinity of a center of the tube and in many cases, a large mount of carbon having a disordered structure surrounds it.

(Application of Carbon Nanotube)

Next, conventional applications of carbon nanotubes are described below. At present, no carbon nanotube-applied products have been yet put on the market but research and development activities are actively taken. Among of them, some typical examples are briefly described below.

(1) Electron Source

Since carbon nanotubes have sharp ends and electric conduction, in many studies, they have been treated as electron sources. W. A. deHeer et al. (Vol. 270, 1995, p1179) reported in "Science" that carbon nanotubes produced by the arc discharge method are prepared on a board with a filter after purification to use as electron sources. This report describes that a collection of carbon nanotubes was used for electron sources and an emission current of 100 mA or higher was stably gained from a 1 $cm^2$ area by applying 700V of voltage.

Moreover, A. G. Rinzler et al. reported in "Science" (Vol. 269, 1995, p1550) that they attached one of the carbon nanotubes produced by the arc discharge method to an electrode and evaluated its characteristic, which proved that from a carbon nanotube, of which ends were closed, an emission current of about 1 nA and from a carbon nanotube, of which ends were open, an emission current of about 0.5 $\mu$A were gained, respectively when voltage of 75 V was applied.

(2) STM, AFM

H. Dai et al. reported the applications of carbon nanotubes to STM and AFM in "Nature" (384, 1996, p. 147). The carbon nanotubes used in this study were produced by the arc discharge method, of which ends were 5 nm-diameter SWNTs. It was said that since their tips were thin and flexible, they could be observed even at bottoms of gaps of a sample and the tips of the nanotube might hardly be crashed (3) Hydrogen Storage Material A. C. Dillon et al. reported in "Nature" (Vol. 386, 1997, p377 to 397) that the carbon nanotubes using SWNTs could store hydrogen molecules several times those for the carbon nanotubes made of a pitch-based material. Although a study about the applications has just begun, they are expected to be a promising material for hydrogen storage, for example, for hydrogen-fueled cars in the future.

At present, three types of methods are mainly used for manufacturing the carbon nanotubes mentioned above. Concretely, the methods include a method (the pyrolysis method using the catalyst) similar to the vapor-phase epitaxy method for manufacturing the carbon fibers, the arc discharge method, and the laser evaporation method. In addition to the three types of methods mentioned above, a plasma synthesis method and a solid reaction method are known.

Here, these typical three methods are briefly described below.

(1) The Pyrolysis Method Using the Catalyst

The method is almost the same as the vapor-phase epitaxy method for manufacturing the carbon fibers. The details of such a method have been described by C. E. SYNDER et al. in International Patent WO89/07163 (International Publication Number). It is indicated that ethylene and propane are introduced mixed with hydrogen as a material gas, as well as metal fine particles into a reaction vessel in their study and in addition to them, saturated hydrocarbon such as methane, ethane, propane, butane, hexane, and cyclohexane and oxygen such as acetone, methanol, and carbon monoxide may be used for the material gas.

The report described a preferable ratio of material gas and hydrogen of 1:20 to 20:1, recommended Fe or a mixture of Fe and Mo, Cr, Ce, or Mn as catalysts, and proposed a method, by which the catalyst was kept adhesive on a fumed alumina layer, as well. It is preferable that with regard to the reaction vessel, flow rates of the gas with hydrogen and the material gas with carbon are set to 100 sccm/inch and 200 sccm/inch, respectively at a temperature in a range of 550 to 850° C. and in this case, about 30 minutes to one hour after finely-divided particles are introduced, the carbon nanotubes begin to grow.

With respect to a shape of the resultant carbon nanotube, its diameter is about 3.5 to 75 nm and length is 5 to 1000 times the diameter. A mesh structure of carbon is parallel to an axis of the tube with less pyrolytic carbon adhered to an outer wall of the tube.

It was reported by H. Dai et al. ("Chemical Physics Letters" 260, 1996, p.471 to 475) that regardless of low efficiency of production, Mo was used as a catalytic nucleus and the material gas of carbon monoxide reacted at 1200° C., allowing SWNT to be produced.

(2) The Arc Discharge Method

The arc discharge method, which was first discovered by Iijima, is described in detail in "Nature" (Vol. 354, 1991, p 56 to 58). The arc discharge method is a simple method, by which direct current arc discharge is performed using carbon electrode rods in an atmosphere containing argon under about 13300 Pa (100 Torr). The carbon nanotubes grow with 5 to 20 nm of carbon particles in partial area on a surface of a negative electrode. The resultant carbon nanotubes have a layer structure, in which tubular carbon meshes with 4 to 30 nm of diameter and about 1 to 50 μm of length are overlapped; the mesh structure of carbon being helically formed in parallel with its axis.

Helical pitches depend on tubes or layers in the tube and for multilayer tubes, a distance between the layers is 0.34 nm, which is almost identical to a distance between graphite layers. The open ends of the tubes are also covered with a carbon interconnection.

Moreover, T. W. Ebbesen et al. reported a condition, in which a large amount of carbon nanotubes was produced by the arc discharge method in "Nature" (Vol. 358, 1992, p220 to 222). To be concrete, arc discharge of about 18 V and 100 A was generated in the condition, in which a 9 mm-diameter carbon rod for a cathode and a 6 mm-diameter carbon rod for an anode were used, respectively, which were oppositely disposed 1 mm apart from one another in a chamber, in the atmosphere containing helium under about 66500 Pa (500 Torr).

If a pressure lower than 66500 Pa (500 Torr) is applied, less carbon nanotubes are produced, while even if the pressure higher than 66500 Pa (500 Torr) is applied, the total amount of carbon nanotubes to be produced is small. In the optimal condition of 66500 Pa (500 Torr), a percentage of carbon nanotubes in a product reaches 75%. When an input power is varied or argon is contained in the atmosphere instead of helium, a yield of carbon nanotubes would become lower. Note that the carbon nanotubes are prone to gather in the vicinity of centers of the carbon rods.

(3) The Laser Evaporation Method

The laser evaporation method was reported by T. Guo et al. in "Chemical Physics Letters" (243, 1995, p. 49 to 54) and A. Thess et al. reported in "Science" (vol. 273, 1996, p. 483 to 487) that lope-like SWNTs were produced by the laser evaporation method. The method is generally described below.

After the carbon rods, of which surfaces Co and Ni are dispersed on, are put into a quartz tube and Ar (argon) is filled in the quartz tube under 66500 Pa (500 Torr), a whole tube is heated to about 1200° C. From an upstream end of the quartz tube, NdYAG laser is focused on the carbon rods to heat for evaporate. Then, on a downstream side of the quartz tube, carbon nanotubes are deposited. The method is a promising method for producing SWNTs selectively and has its own characteristics, for example, SWNTs are prone to gather into a rope like shape.

In the conventional carbon nanotube structures and manufacturing methods mentioned above, the resulting carbon nanotubes vary widely in both thickness and direction and immediately after they have been produced, the electrodes have not yet jointed the carbon nanotubes. This means that before the carbon nanotubes can be used, after synthesis, they must have been collected, purified, and formed into specific shapes depending on individual applications.

For example, since when an attempt was made to apply the carbon nanotubes to electric circuits, not only was it difficult to handle the carbon nanotubes because of their very fine sizes but also no method had been yet proposed for producing high-density wiring such as integrated circuits (ICs), the only thing subject to evaluation was that a single-structure fine element, which was produced by preparing fine electrodes, on which the carbon nanotubes were grown as shown in "Nature" (vol. 397, 1999, p. 673 to 675). In addition, it is preferable to build the carbon nanotubes in circuits effectively with no loss because they are very expensive.

The problems of difficult handling and expensiveness are large obstacles to actual application to devices.

As one of breakthroughs, electric signal processing simulating a mechanism of a brain, which is different from those of conditional electronic circuit devices, may be considered. Unlike conditional electric wirings, the carbon nanotubes provide multi-wirings as if they were neurons in brain, possibly allowing a non-Neumann type of processing mechanism, which is different from that of conventional computation to be implemented. Nevertheless, it has not yet been reported that a structure of carbon nanotubes and fibers was used to transmit and process signals.

It is estimated that a thin film can be manufactured from carbon nanotubes in a method for forming an organized structure of the carbon nanotubes in which the carbon nanotubes are well dispersed in the dispersion medium to prepare the liquid with the carbon nanotubes dispersed, the liquid is dropped on the planar board, and then the planar board is dried. So far, a practice has been performed that the liquid with the carbon nanotubes dispersed on is dropped on the planar board, leaving a trace amount of carbon nanotube lump by chance. These products have been treated as an infinitesimal residue, of which the amount was well within an expected range, instead of an established manufacturing method specific to the carbon nanotubes.

As known from the term "molecular self-assembly", as the disperse medium dries gradually up from the liquid, which was prepared by the fine objects were dispersed in the dispersion medium, the fine objects may form a thin film, in which the fine objects are closely packed. However, in this case, the fine objects behave freely in the liquid without binding each other except for its aggregation. For this reason, when the fine objects are closely packed in the film during a drying process of dispersion-medium, contact between the fine objects each other is governed by only the aggregation exerted among the fine objects. This means that aggregates of fine objects are separated out and form a film together. This is the reason why a domain, in which the fine objects are closely packed, is prone to being formed of plural separate islands of the fine objects.

In the case of using conductive particles as fine objects, if they can be distributed into a network, even a small amount of fine objects allow the whole surface of the board to be conductive, although, as mentioned above, only by drying the dispersion medium from the liquid with the fine objects dispersed, the domain is prone to being stably formed of plural separate islands of the fine objects. This is the reason why, to make the planar board conductive, conductive particles has to be used by the amount, which can cover almost the whole surface of the planar board.

A problem of the liquid with the fine objects dispersed mentioned above, is essentially applicable to the case of the use of the carbon nanotubes instead. In the other words, since the carbon nanotube lumps, which were produced by dropping the liquid with the carbon nanotubes dispersed on the planar board and drying it up, usually were formed into plural separate islands and isolated within each of domains, electrical and/or magnetic connectivity among them was broken. This has been an obstacle to forming a useful network for a carbon nanotube structure. For this reason, simply to make the whole surface of the planar board conductive, the carbon nanotubes had to be used by the amount, which could cover almost the whole surface of the planar board. In this case, since a remarkably large amount of carbon nanotubes are required, there is no merit found in the use of carbon nanotubes.

SUMMARY OF THE INVENTION

The invention is designed to provide carbon nanotube structures, in which networks with a desired area and volume, where carbon nanotubes are electrically or magnetically connected, are formed and the method for easy manufacturing the carbon nanotube structures with less carbon nanotube structures. The invention is also designed to provide carbon nanotube devices, to which such useful carbon nanotube structures mentioned above are applied.

The inventors conceived this invention through a process of studying the relationship among the density of carbon nanotubes in a dispersing liquid, characteristics of the dispersing liquid, and the construction of the resulting carbon nanotube structures.

According to an aspect of the present invention, the method for manufacturing carbon nanotube structures includes the step of: applying a high-viscosity dispersed liquid which includes carbon nanotubes and a low-viscosity dispersion medium dispersed the carbon nanotubes, and forming a network of the carbon nanotubes having electrical and/or magnetic connections therebetween by removing the low-viscosity dispersion medium from the applied the high-viscosity dispersed liquid.

According to another aspect of the invention, the carbon nanotube structures are formed by networks including electrical and/or magnetic connections among carbon nanotubes, which are formed by removing a low-viscosity dispersion medium from a high-viscosity dispersing liquid with the carbon nanotubes dispersed in the dispersion medium.

Another aspect of the present invention is carbon nanotube devices that contain the carbon nanotube structures.

The carbon nanotube devices have the carbon nanotube structures, in which networks are formed by plural carbon nanotubes randomly intercrossed, supports, which support the carbon nanotube structures, and plural electrodes disposed on the supports, which are provided on the supports and electrically connected to the carbon nanotube structures and used as electrical terminals connected to external devices.

The invention mentioned above is the first to prove that the carbon nanotubes can be arranged on almost the whole surface of the area in contact with high-viscosity dispersing liquid with the carbon nanotubes dispersed, and it is the first to propose that the surface with the carbon nanotubes arranged on it can function as a device part.

BRIEF DESCRIPTION OF THE DRAWINGS

Preferred embodiments of the present invention will be described in detail based on the followings, wherein.

DETAILED DESCRIPTION OF THE INVENTION

The present invention will be described below in detail.
<Operation of the Invention>
First of all, the operation mechanism of the present invention will be described below.

Figure 1:
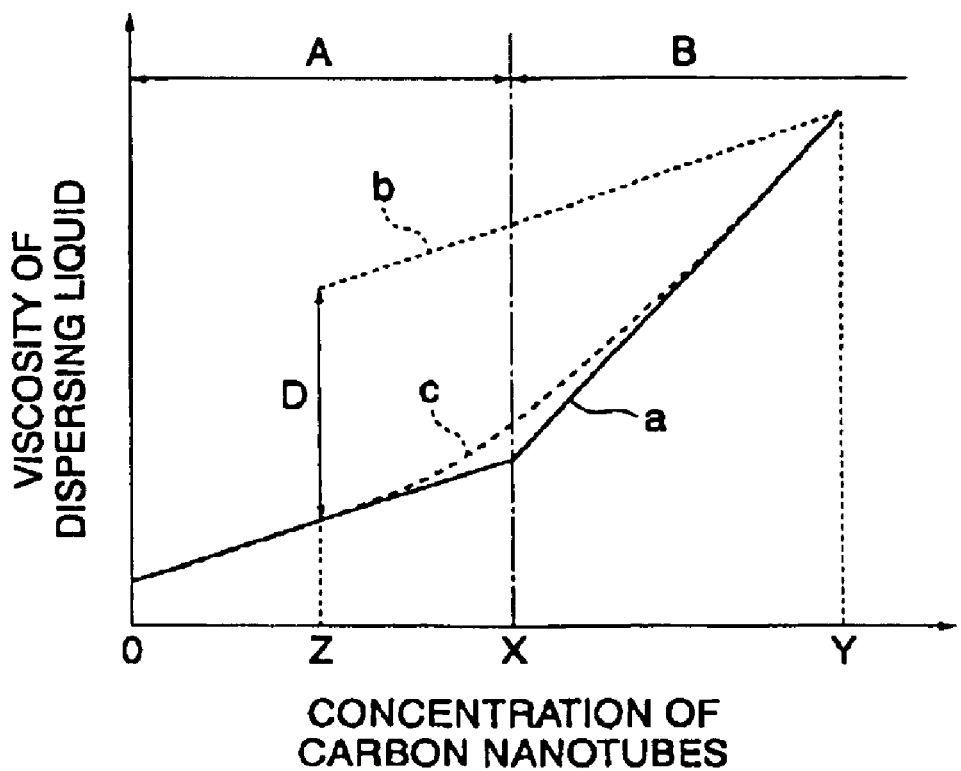
FIG. 1 is a graph showing a relationship between the concentrations of the carbon nanotubes in a liquid with the carbon nanotubes dispersed and the viscosities of the liquid.

Generally, with respect to a dispersing liquid dispersing fine objects in a dispersion solvent, the higher a concentration of the fine objects is with keeping the dispersion of the objects, the higher a viscosity of the dispersion medium becomes. In the case of the use of the carbon nanotubes as the fine objects, it is essentially applicable and as shown in the solid line a) at Interval A in FIG. 1, as the density of the carbon nanotubes increases, the viscosity of the liquid with the carbon nanotubes dispersed becomes higher. FIG. 1 is a graph showing the relationship between the density of the carbon nanotubes in the liquid with the carbon nanotubes dispersed and the viscosity of the liquid.

On the other hand, the inventors discovered that in the liquid with the carbon nanotubes dispersed, as the density of the carbon nanotubes increases, the rate of increase in viscosity is accelerated when the viscosity reaches a certain critical point. Concretely, around the critical point X of the solid line a) of FIG. 1, a gradient of a line indicating the relationship between the density of the carbon nanotubes and the viscosity of the liquid with the carbon nanotubes varies, the area at the interval B being steep compared with that at interval A.

This phenomenon can be described below.

In the area at the interval A with a lower carbon nanotube density, like the liquid with the fine objects, the carbon nanotubes behave freely without bonding each other. For this reason, although the carbon nanotubes aggregate together, essentially, the viscosity of the liquid becomes proportionally higher depending on an abundance ratio of the carbon nanotubes contained in it.

However, the carbon nanotubes are long fine tubular fine objects. The density of the carbon nanotubes further increases, the probability of an abundance ratio of the carbon nanotubes in the liquid becomes higher, resulting in smaller gaps among the carbon nanotubes. This means that the carbon nanotubes bridge between the carbon nanotubes or between aggregates of them (bridging).

When this type of bridging begins, the viscosity of the liquid with the carbon nanotubes dispersed is not governed only by the abundance of the carbon nanotubes and it becomes rapidly higher depending on the degree of bridging. This means that the density of the carbon nanotubes, at which bridging begins, is the critical point X of the solid line a) of FIG. 1 and at the interval B, the liquid with the carbon nanotubes dispersed is forming the liquid bridges.

In this way, as the density of the carbon nanotubes increases, the so-called networks, in which the bridges connect between the carbon nanotubes and between the aggregates of them in the liquid, are formed.

At the interval A, the liquid with carbon nanotubes dispersed may be unstable due to agglutination of the carbon nanotubes each other mentioned above and without enough stirring, the carbon nanotubes may aggregate and are precipitated. On the other hand, at the interval B, the carbon nanotube bridges connect between the carbon nanotubes and between their aggregates and since the carbon nanotubes contributing to this type of bridging act as a dispersing agent, the dispersing liquid becomes stable. For this reason, with less or no stirring, the carbon nanotubes are not precipitated and the networks of the carbon nanotubes are kept.

Since the shapes of the networks are very solid, even if the dispersion medium is removed, the density of the carbon nanotubes becomes high, while linkage among them is kept. On the other hand, even if the dispersion medium is added to drop the density of the carbon nanotubes in the dispersing liquid, the density of the carbon nanotubes becomes lower, while linkage among them is kept. A dashed line b) of FIG. 1 shows the relationship between the density of the carbon nanotubes and the viscosity of the liquid when the density of the carbon nanotubes is increased to Y and then by adding the dispersion medium, the density of the carbon nanotubes is reduced to Z again. This indicates the density is higher (indicated by Sign D) than that of the liquid with a density, Z, which do not pass through the interval B. Thus, with respect to the liquid, which reaches the interval B and then the carbon nanotube networks are formed in it, even if the density of the carbon nanotubes is reduced, the networks are kept and although the viscosity becomes low as the density decreases, the high-viscosity is indicated owing to bridging.

Note that the solid line a) of FIG. 1, the dispersing liquid with the carbon nanotubes dispersed, which serves as a model and in which the carbon nanotubes with equal thickness and length are dispersed, is assumed. If the dispersing liquid, in which the carbon nanotubes having unequal thickness and length are dispersed, is assumed, a trace as shown in a dotted line c) of FIG. 1 is drawn and it is difficult to find the definitive critical point. Note that a similar trend is found, and a gradient of a curve indicating the relationship between the density of the carbon nanotubes and the viscosity of the liquid is steep at the interval B compared with that at the interval A. This means that in the liquid at interval B, so-called networks, in which the bridges connect between the carbon nanotubes and between the aggregate of them, are formed.

In the invention, the carbon nanotube structures, in which the networks of the carbon nanotubes are formed by removing the dispersion medium from the dispersing liquid having the networks in it, which was prepared in the way mentioned above, are manufactured.

In the other words, in the invention, the method is provided for producing the carbon nanotube structures, in which the networks, where electrical and/or magnetic connections are established among the carbon nanotubes by removing the dispersion medium from the high-viscosity dispersing liquid, which was prepared by dispersing the carbon nanotubes in the low-viscosity dispersion medium, and the carbon nanotube structures and the devices using them are attained.

In this case, the "high-viscosity dispersing liquid" means the dispersing liquid, in which the density of the carbon nanotubes was adjusted, for example, by adding the dispersion medium to the liquid shown at the interval B of the lines a) and c) of FIG. 1 or the dispersing liquid of interest, or by removing a certain amount of dispersion medium from the dispersing liquid. This does not mean that the liquid with the carbon nanotubes dispersed has a given density or higher. In the other words, with respect to he invention, the term the "high-viscosity dispersing liquid" indicates the dispersing liquid, in which the networks of the carbon nanotubes are formed by carbon-nanotube bridging between the carbon nanotubes and between their aggregates. For example, in FIG. 1, it can be said that even the dispersing liquid shown at the interval A of the dashed line b) of FIG. 1, of which density was slightly decreased by adding the dispersion medium to the liquid with carbon nanotube density, Y shown in the solid line a), has the high-density relative to the liquid with the same density, which does not pass through the interval B, shown in the solid line a) and is included in the "high-viscosity dispersing liquid" category used in the invention.

On the other hand, the "low-viscosity" dispersion medium corresponds to the "high-viscosity" liquid with the carbon nanotubes dispersed and the "liquid with also high-viscosity, which is prepared from the dispersion medium, because the dispersion medium has high-viscosity" is excluded. For this reason, with respect to the dispersion medium, the term "low-viscosity" does not mean that it has a viscosity lower than a given level.

In the networks formed in the invention, the carbon nanotubes are not always in contact with each other. Considering the usefulness of the carbon nanotube structures, at least, electrical and/or magnetic connections are established among the carbon nanotubes.

The "network" means the shape, in which junctions, at which plural carbon nanotubes are electrically and/or magnetically connected and circles of the carbon nanotubes are linked at the junctions, and two or more circles linked at the junctions, which include the former circle (overlapped with the former circle), are found.

Figure 2:
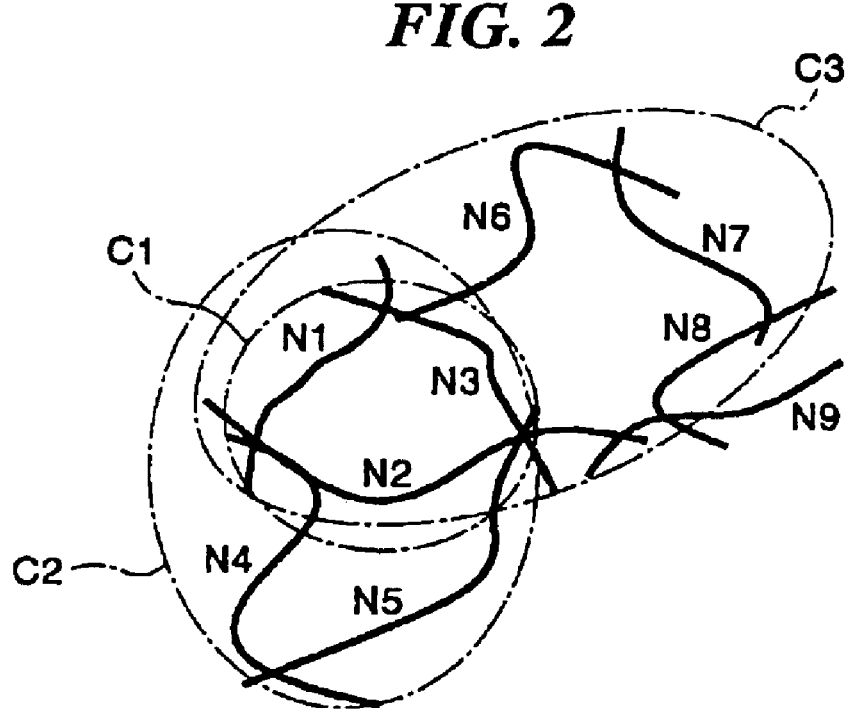
FIG. 2 is an expanded schematic view showing an example of a carbon nanotube aggregate to explain the concept of a network of carbon nanotubes.

Based on FIG. 2, the aggregate of the carbon nanotube is described below. FIG. 2 shows an example of the aggregate of the carbon nanotubes. Intersections among plural carbon nanotubes N1 to N9 are the junctions. As already known, even if the junctions are not physically in contact with each other, they may be electrically and/or magnetically connected.

The aggregate of the carbon nanotubes shown in FIG. 2 has a circle C1 formed by three carbon nanotubes N1 to N3. In addition, it has a circle C2 formed by four carbon nanotubes N1, N4, N5, and N3. Further, it has a circle C3 formed by seven carbon nanotubes N1, N2, N9, N8, N7, N6 and N7.

Considering the relationship among three circles, the circle C2 includes the circle C1. The circle C3 also includes the circle C1. This means that with the circle C1 included (overlapped with the circle C1), two circles C2 and C3 are found. In the other words, the aggregate of the carbon nanotubes shown in FIG. 2 may be included in the concept of the "network" according to the invention.

Note that in the figure, although other circles are found, in order to confirm the definition of the network, it is sufficient that the relationship mentioned above is established among at least any three circles. With respect to the condition shown in FIG. 2, it is sufficient that only three circles C1 to C3 are considered.

The construction of the resultant carbon nanotube structure of the invention can be investigated deeply in SEM observation without evaporating metal because the carbon nanotubes are in contact with each other.

The carbon nanotube structures of the invention, unlike the carbon nanotube structures, in which, for example, the fine objects, have such a function that the carbon nanotubes are intersected each other or bundle together. For this reason, even if the density of the carbon nanotubes is low in the high-viscosity dispersing liquid and the density of the carbon nanotubes in the resultant carbon nanotube structure is low, high electric and/or magnetic characteristics can be achieved by the network of the carbon nanotubes.

In addition, as a side effect, high optical transmittance is achieved. Generally, if an attempt is made to give electrical conductivity on the surface of the planar board using, for example, the finely-divided particles, they must be closely packed to cover the whole surface of the planar board. On the other hand, light can be easily transmitted using the carbon nanotubes because the surface of the planar board is not always entirely covered with them and many gaps on the surface of the planar board are left.

As reported in Phys. Rev. B 62 R2307 (2000), the electrical conductivity among the carbon nanotubes is lower than that within the carbon nanotube. It is suggested that the characteristic might be used to manufacture fine electric wirings and electric circuits not found before with use of the carbon nanotubes. Therefore, according to the carbon nanotubes of the invention, with no need for fine handling, large-scale electric circuits can be manufactured, which has a high industrial value.

Since the carbon nanotubes have a fine and long shape, the carbon nanotube structures, which are formed by removing the dispersion medium from the high-viscosity dispersing liquid, sticks on the surfaces of the objects by the Van der Waal's force (the force exerted among materials) and intertanglement among the carbon nanotubes with no special chemical treatment. Accordingly, for example, the layer of carbon nanotube structure can be further deposited on the planar board to manufacture the carbon nanotube devices having multi-layer film. Since the resultant carbon nanotube structure is networked, the structure is hard to break up owing to the force exerted among materials and intertanglement. In particular, at the trapping sites mentioned later, the network attaches to the surface of the object owing to the "force exerted among materials" between the trapping sites and carbon nanotubes behaves as a large molecule, and is hard to re-dissolve.

Furthermore, plural layers containing the carbon nanotube structures (hereafter, simply referred to as "carbon nanotube structure layer") can be deposited and materials with different characteristics can be inserted among the carbon nanotube structure layers. Novel multifunctional devices can be manufactured by forming various types of laminated structures, for example, an insulating layer is inserted between each pair of carbon nanotube structure layers to insulate between the layers a semi-conductive or conductive substance is inserted between them to force any interaction such as coming and going of electrons or electric currents, a construction is inserted within the layer to form a specific portion, in which the interaction between the layers is achieved (a signal channel).

<Method of Manufacturing the Carbon Nanotube Structures>

In the method of the invention for manufacturing the carbon nanotube structures, by removing the low-viscosity dispersion medium from the high-viscosity dispersing liquid, which was prepared by dispersing the carbon nanotubes in the dispersion medium, the networks, in which electrical and/or magnetic connections are established among the carbon nanotubes, are formed.

Since the dispersion medium, which can be used in the invention, need not to have a viscosity lower than a given level and the carbon nanotube is insoluble to organic solvent, there is no special restriction to it. If the other objects mentioned later are dispersed, a liquid, which does not dissolve the other objects, may be selected. Note that to disperse the carbon nanotubes better at the first stage, it is preferable that the viscosity of the liquid is low. The desired viscosity for the dispersion medium is preferably 0.1 Pa/s or lower and more preferably within 0.00001 to 0.01 Pa/s.

Concrete examples include water, water solutions containing a surfactant, water solutions containing ions, water solutions containing polymer molecules, carbon hydrates containing 1 to 30 carbon molecules, alcohols, ethers, ketones, and aromatic group such as benzene, dichlorobenzene, and toluene, as well as the mixture of any of them. In these dispersion media, associative molecules can be contained. Since, using the effect of molecular association, the viscosity of the dispersion medium can be adjusted, a moderate amount of molecules easy to meet may be contained to achieve the desired viscosity for use.

With respect to these dispersion media, temperature dependency of the viscosity may be used to adjust the temperatures of the dispersion media to achieve the moderate viscosity.

For the carbon nanotube in the invention, both SWNT and MWNT may be used. Generally, SWNT is more flexible than MWNT, which has less flexibility and are prone to become less flexible as the number of layers increases. It is desired that SWNT and MWNT are used depending on applications considering their properties.

Although the length of the applicable carbon nanotube is not especially limited, usually the carbon nanotubes with 10 nm to 1000 $\mu$m in length are used and the carbon nanotubes with 20 nm to 100 $\mu$m in length are preferably used. Although the diameter of the applicable carbon nanotube is not especially limited, usually the carbon nanotubes with 1 nm to 1 $\mu$m of diameter are used and the carbon nanotubes with 3 nm to 500 nm of diameter are preferably used if moderate flexibility is required.

Since the untreated carbon nanotubes have impurities such as amorphous carbon and a catalyst contained, it is preferable that they are removed by purification.

Although the high-viscosity dispersion medium can be adjusted by further dispersing the additional carbon nanotubes, since the aggregation among the carbon nanotubes is high, at an initial stage of dispersing of the carbon nanotubes (the interval A in lines a) and c) of FIG. 1), it is desired that they are strongly stirred to avoid their aggregation and precipitation. Concretely, it is preferable that with any of a ultrasonic distributor, stirring rod distributor, stirring blade distributor, vibrating mixer, and shaker, they are dispersed and especially the ultrasonic distributor is preferably used. It is preferable that a concrete output of the ultrasonic distributor is 0.1 w/ml of the dispersion medium and more preferable within 0.5 to 10 W.

In preparing the high-viscosity dispersing liquid, to improve the dispersibility of the carbon nanotubes, the dispersing agent such as the surface-active agent may be added in the dispersion medium if necessary.

In the way mentioned above, while the dispersion medium is strongly stirred, the carbon nanotubes are carefully added. Then, as shown in lines a) and c) of FIG. 1, at a certain density of the carbon nanotubes (the critical point X shown in FIG. 1), the rate of increase in viscosity is accelerated. Continuing adding of the carbon nanotubes, the dispersion liquid indicates higher viscosity as if it were a polymer solution or any other solution containing an adhesive. The resulting dispersion liquid is referred to as the high-density dispersion liquid in the invention.

Since the viscosity of the high-density dispersion medium largely varies with the factors such as the type, length, and thickness of the carbon nanotube and the viscosity of the dispersion medium itself, preferable values are selected as appropriate. In addition, the critical point X also largely varies with these conditions. For example, if water is used as the dispersion medium and SWNT with 5 $\mu$m in length and 4 nm in thickness in average are dispersed in it, the critical point X falls within about 1 to 10 g/liter of density of the carbon nanotubes. It is preferable that the viscosity of the high-density liquid is 0.001 Pa/s or higher and more preferable within 0.002 to 0.02 Pa/s. On the other hand, if the longer carbon nanotubes are used, since the network with lower viscosity is formed by the carbon nanotubes, the range of preferable values becomes considerably lower. In particular, considering a reduction in the usage of the carbon nanotubes, it is preferable that a better network is formed with its viscosity kept low. If transparency (described later) is required for the carbon nanotube structures, the lower viscosity is desired. To meet the requirements of the reduction in the usage of the carbon nanotubes and transparency, it is useful that the viscosity of the high-viscosity dispersion medium is kept low, the network of the carbon nanotubes is formed, the dispersion medium is added to it, and reducing the density.

In other words, by adjusting the density of the carbon nanotubes in the high-viscosity dispersing liquid, the number of the carbon nanotubes in the carbon nanotube structure to be manufactured can be controlled. This means that if it is wanted that the high-density networks made of the large amount of carbon nanotubes are formed in the carbon nanotube structures to be manufactured, the density of the carbon nanotubes in the high-viscosity of the carbon nanotubes in the high-viscosity of liquid can be increased. On the other hand, if the low-density networks made of a small amount of carbon nanotubes are formed in the carbon nanotube structures to be manufactured, the density of the carbon nanotubes in the high-viscosity of the carbon nanotubes in the high-viscosity of liquid can be decreased. To decrease the density of the carbon nanotubes, it is preferable that the high-density carbon nanotubes are adjusted and then the dispersion medium is added in it.

In the high-viscosity dispersing liquid, other objects can be further added. By keeping the other objects in the liquid, the other objects can be mixed in the finally-produced carbon nanotube structures, which allows the functions corresponding to the functions of the other objects to be given to the carbon nanotube structures.

If the objects, which have neither electrical nor magnetic effects, are used for the other objects, they can behave spacers. This means that, by arranging the other objects at the gaps in the networks of the carbon nanotubes formed in the high-density liquid, when the carbon nanotube structures are formed by removing the dispersion medium, although the gaps formed among the carbon nanotubes are reduced, they can function as the spacers to keep a certain width of gaps among the carbon nanotubes provided that the other objects are inserted at the gaps.

With respect to the other objects, which have a function similar to that of the spacers, there is no special limitation, and for example, particles, fibers, crystals, and aggregates can be used.

The particles available for the other objects, which have a function similar to that of the spacers, include organic matters such as polymers, inorganic matters such as ceramics and metals, or compounds containing the both of them. Both the particles manufactured by grinding and the particles manufactured by controlling their size physically or chemically can be used depending on the applications.

The fibers available for the other objects, which have a function similar to that of the spacers include artificial fibers such as polyester and nylon, natural fibers such as cotton, and biological fibers such as spiders' thread.

The crystals available for the other objects, which have a function similar to that of the spacers, include structures in which fine molecules, atoms, and particles are packed, and structures in which they are regularly arranged. Concretely, metal crystals, non-metal crystals, ion crystals, molecular crystals, and particulate crystals can be used. Any other crystals in the natural world may be used.

The aggregates available for the other objects, which have a function similar to that of the spacers, include amorphous materials in which atoms are packed, molecular aggregates in which the molecules are packed, particulate aggregates, in which particles are closely packed, and compound aggregates, in which some kinds of them are aggregated. However, they are the aggregates and their internal regularity cannot be identified.

With respect to the shape of the other objects, which have a function similar to that of the spacers, various kinds of shapes can be selected to control the constructions of the carbon nanotube structures to be manufactured. It is preferable that the polymer fine objects, which are easy to be formed into the desired shapes, are selected. In particular, it is preferable that the latex fine objects, which are commercially available easily, as well as of which sizes and shapes are easily controlled, are selected. Since the latex fine objects are manufactured by chemical synthesis, they are easy to be chemically modified on their surfaces. They have a merit that allow easy control into the carbon nanotubes with desired characteristics.

The polymers used as the polymer fine objects include various kinds of plastic resins, thermosetting resins, and photo-curing resins and the like.

The other objects which have a function similar to that of the spacers, can take various shapes as mentioned above and various shapes can be selected to control the constructions of the carbon nanotube structures. On the other hand, it is preferable that a shape of sphere is selected for the carbon nanotubes to be difficult to fix.

An average diameter of the other object, which has a function similar to that of the spacer, equivalent to a sphere, may be selected as appropriate, preferably being about 10 nm or larger and 1000 $\mu$m or smaller, more preferably being 20 nm or larger and 100 $\mu$m or smaller, and further preferably being 50 nm or larger and 10 $\mu$m or smaller.

On the other hand, if, for the other objects, the objects which have a functionality such as involvement in electrical conductivity and/or magnetic property (for example, functional molecules) are used, the functionality corresponding to the functionality of the objects can be given to the carbon nanotube structures.

By arranging the other objects having the functionality at the gaps among the carbon nanotubes and/or in the vicinity of them and structuring, various functionalities can be given the resulting carbon nanotube structures.

The other objects having the functionality include atoms, molecules, ions, particles, and polymers, as well as molecules and tissues extracted from the organisms and they have such properties as insulation, conductivity, semiconductivity (including semi-conductive and electric resistance properties), absorbance, light emission, color development property, elasticity, power generation, and photosensitivity. These properties may be those which are affected by temperature, humidity, or ambient gases.

In addition, functional molecules or functional fine particles which have designed functions, may be used. Recently, the semi-conductive property has been found in most of the molecules and fine particles and a switching function and a memory function can be given to the contacts among the carbon nanotubes and the aggregates of them.

It is preferable that for functional molecules, the molecules in which charges are localized, are selected including molecular species having a charge donor property, the molecules combined with molecular species having a charge acceptor property, molecules combined with molecular species having a charge donor property or a charge acceptor property in symmetrical molecules, giant molecules repeatedly connected with these molecules, or the aggregates of molecules, which are forced to function by the aggregates of the molecules mentioned directly before. Note that the charge donor and acceptor properties can be defined as an electron affinity level and ionized potential level.

Furthermore, the organismic molecules such as DNAs and collagen or any artificial molecules, which simulate the organisms, may be used and the functions similar to those of the organisms can be given the carbon nanotube structures.

The functional fine particles include metal fine particles such as gold, metal oxide fine particles such as $ZnO_2$ and $TiO_2$, intermetallic compound fine particles such as alloys, structures of carbon atoms such as fullerene, fullerence derivatives, polymer particles, micellar structures in solutions, and colloidal structures, as well as vesicle made of lipid, ceramics, and dendrite structure and the compound of them or they, which were pre-treated, may be used depending on the applications.

For example, if nanoparticles of gold are used as the functional fine particles, the characteristics of the conductive networks of the carbon nanotubes are improved.

It is preferable that the particles to be used the functional molecules or the functional fine particles are added to the high-viscosity dispersing liquid, which was prepared from the carbon nanotubes and the dispersion medium.

The functional molecules and the functional fine particles are hard to be handled because of their small sizes and it is preferable that they are designed so that they can be correctly arranged by modifying with a chemical functional group to ensure inter-recognition.

At least some of the other objects having the functionality can be arranged at the gaps among the carbon nanotubes. This arrangement at the gaps among the carbon nanotubes allows the functionality mentioned above to be given. At that time, it is also a desirable embodiment that at least some of the other objects having the functionality possesses the bridging function which bridges between the carbon nanotubes. This means that by bridging between the carbon nanotubes with the other objects, the carbon nanotube structure can simulate a whole molecular structure, allowing the functionality to be given at a higher level as a whole. Furthermore, the bridging function of the other objects having the functionality enables the structures and arranged carbon nanotubes to be closely packed each other, resulting in stronger solidification of the carbon nanotube structure as a whole.

For the other objects having the bridging function, the atoms, molecules, ions, particles, or fibers, which have two or more sites, with which the carbon nanotubes bind characteristically and are hard to separate from, may be used. It is preferable that the carbon nanotubes themselves are pre-treated. For example, when the carbon nanotubes are treated with a strong acidic solution, they become carbon nanotubes having carbonyl groups (COOH). In this case, it is easy to bridge among the carbon nanotubes by the molecules, which contain any of the functional groups easy to react with the carbonyl groups such as a hydroxyl group (OH), amino group ($NH_2$), and mercapto group.

In addition, the carbon nanotubes containing any of water-soluble functional groups such as a carbonyl group can be ionized in a water solution and the bridging structure can be introduced using multivalent ions. For example, with carboxylic acid ionized ($COO^-$), the multivalent ions can be used such as calcium ions ($Ca^{2+}$), magnesium ions ($Mg^{2+}$), and Aluminum ions ($Al^{3+}$).

Although the high-viscosity dispersing medium can be attained, in many cases, since the carbon nanotubes have carbon structures other than the carbon nanotubes such as catalytic metal or amorphous carbon, it is preferable that any catalytic metal is eluted by strong acid treatment or any carbon structures other than the nanotubes such as amorphous carbon are removed by filtration, pyrolysis and electrophoresis or chromatography.

By removing the dispersion medium from the high-viscosity dispersing liquid prepared in the way mentioned above, the networks containing electric and/or magnetic connections among the carbon nanotubes are formed to manufacture the carbon nanotube structures.

The dispersion medium is physically removed, for example, by applying centrifugal force or evaporated by heating or leaving as they are.

The dispersion medium is removed with being in contact with given trapping sites or with being in contact with the sites, at which no carbon nanotubes are fixed. Here, the term the "trapping sites" indicate the sites of the object having such a characteristic that the carbon nanotubes are fixed and trapped there after the dispersion medium is removed from the liquid. The almost all the sites of the object that are not specially treated to prevent the carbon nanotubes from fixing may become the trapping sites. Concretely, for example, if, with the high-viscosity dispersing liquid contained in some vessel, the dispersion medium is removed, the carbon nanotubes are deposited at an inner bottom of the vessel. In this case, the inner bottom of the vessel can be considered to be a trapping site. The term the "given trapping sites" indicate the sites of the object, at which the carbon nanotube structures are desirably fixed.

For the trapping site, for example, the planar board can be used. By fixing the carbon nanotube structure of the invention and for example, connecting the electrode to the ends of the carbon nanotube structure of the invention and making wiring, the carbon nanotube structure of the invention can be used as a carbon nanotube device. The concrete embodiments of the carbon nanotube devices are described in the section <Carbon nanotube structures>.

To make the dispersion medium contact with the given trapping site, there is no special limitation and any of general coating methods can be applied. Applicable coating methods include spin coating, dip coating, curtain coating, roll coating, brush coating, and spray coating. Among them, the spin coating method, by which homogeneous thin films of carbon nanotubes can be attained, is especially desirable.

In addition, by dipping the high-viscosity dispersing liquid onto the given trapping site (in the invention, not only applying the high-viscosity dispersing liquid using any of generally used methods such as dip coating but also the case, in which the high-viscosity dispersing liquid is dipped onto the given trapping site and then eluted from there, are included in the concept of "dipping". Note that it is not always required that the trapping sites are not inclined against a gravitational force and it is sufficient that an unwanted amount of the high-viscosity dispersing liquid elutes), the high-viscosity dispersing liquid can make contact with the given trapping site and pass through it. In this case, since the carbon nanotube network has been formed in the high-viscosity dispersing medium, the carbon nanotube structure can be fixedly formed on the given trapping site in the dipping direction unless the dipping rate is too high (unless, for example, the planar board is too inclined).

By forming the channel structure, with which the high-viscosity dispersing liquid makes contact in the trapping site and passing the high-viscosity dispersing liquid through the channel structure to make contact with the trapping site, the carbon nanotubes can be arranged along the channel structure. In this case, if the channel structure has been formed into the desired shape, the carbon nanotube structure in which the network of carbon nanotubes are made into the desired shape can be attained.

The channel structure includes two embodiments (1) and (2) described below.

(1) By Forming the Concave and Convex Parts on the Planar Board, the Channel Structure can be Attained.

When the parts with physical concave and convex shapes are formed on the planar board and the high-viscosity dispersing liquid is dipped onto it, the high-viscosity dispersing liquid flows into the concave parts themselves or into the concave parts formed between the convex parts on the planar board and passes through them. This means that if the channel structure has been formed by appropriately patterning the concave and convex parts, the high-viscosity dispersing liquid passes through the channel structure and the carbon nanotubes are arranged along the channel structure.

The embodiment, in which the concave and convex parts have been formed on the planar board based on the accompanying drawings.

Figure 3:
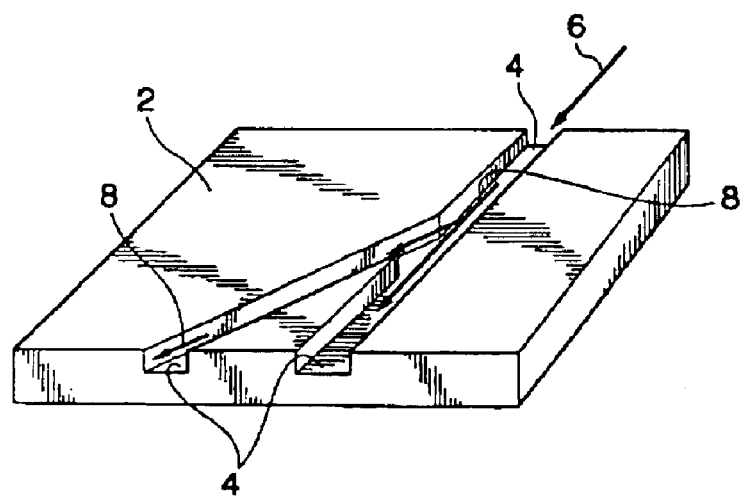
FIG. 3 is a perspective view showing a condition, in which concave-shaped parts are patterned on a planar board as a channel structure.

FIG. 3 is a perspective view showing a condition, in which the channel structure has been formed by patterning the concave parts 4 on the planar board 2. When the high-viscosity dispersing liquid is dipped onto the planar board 2 in the direction indicated by an arrow 6, the high-viscosity dispersing liquid flows into the concave parts 4, which forms the channel structure, in the direction indicated by an arrow 8 and passes through there. When the high-viscosity dispersing liquid passes through the channel structure, the carbon nanotubes 4 are arranged along the concave parts, which forms the channel structure, achieving the carbon nanotube structure, in which the network of carbon nanotubes is formed.

Figure 4A:
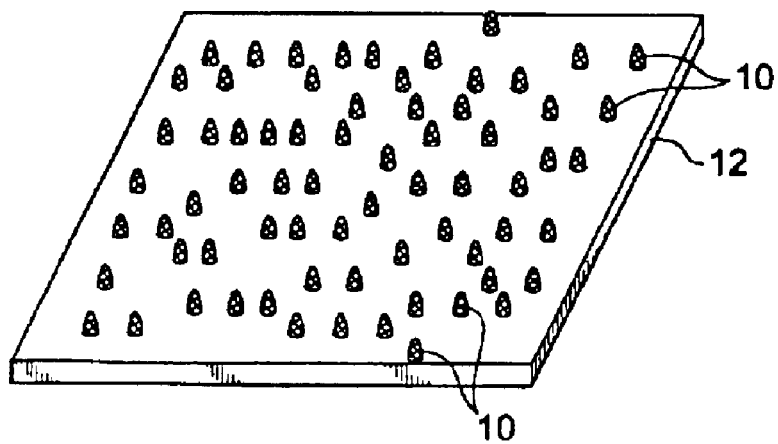
FIG. 4 is a perspective view showing a condition, in which convex-shaped parts are patterned on the board as the channel structure.
Figure 5:
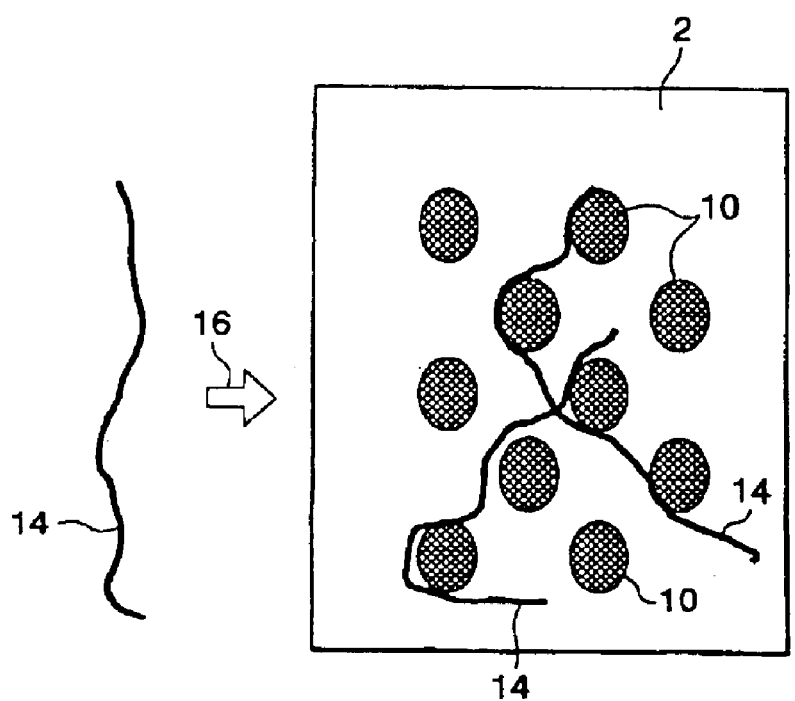
FIG. 5 is an expanded plan view explaining a reason why the carbon nanotubes get stick to the concave parts on the planar board in FIG. 4.

FIG. 4A is a perspective view showing a condition, in which the channel structure has been formed by patterning the convex parts 10 on the planar board 12. When the high-viscosity dispersing liquid is dipped onto the planar board 12 from any direction, the high-viscosity dispersing liquid passes through the spaces among the convex parts in collision with them. At this time, as shown in FIG. 5, when each of the carbon nanotubes 14 in the high-viscosity solution flows in the direction indicated by an arrow 16, it gets stuck on the convex parts 10 when colliding them and the whole structure of carbon nanotubes is retained there. For this reason, the carbon nanotube structure is formed while the carbon nanotubes are getting stick on the convex parts 10. In this case, even if the dipping rate of the high-viscosity solution increases (for example, an angle, at which the planar board is inclined, increases), the carbon nanotube structure is formed along the channel structure while the carbon nanotubes are getting stick on the convex parts 10.

Figure 4B:
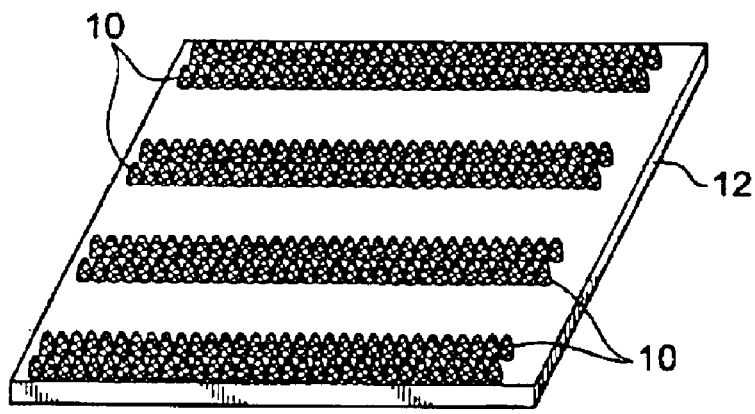
Figure 4C:
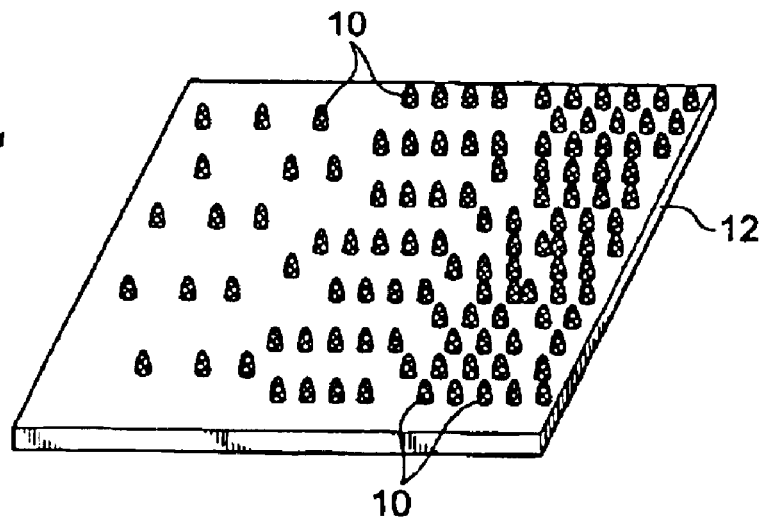

In this embodiment, patterning of the convex parts 10 can be selected appropriately as shown in FIG. 4B or FIG. 4C to form the carbon nanotube structure according to the selected pattern. FIG. 4B shows a patterning example, in which the convex parts 10 are serially arranged with the rows slightly apart from each other. In this case, based on the direction, in which the high-viscosity solution is dipped, the shape of the resulting carbon nanotube structure can be controlled.

FIG. 4C shows another patterning example, in which the convex parts 10 are varied with their places. In this case, at the site with high density of the convex parts 10, the carbon nanotube structure with high density of carbon nanotubes can be formed.

The convex parts 10 may be formed at the same time as manufacturing the board or they may be formed on the planar board by attaching the objects, which can be components of the convex parts, for example, the particles, on it.

If the space between the concave parts (including the convex parts formed between the convex parts) is shorter than the length of the carbon nanotube itself or the length of the bundle of the carbon nanotubes, the carbon nanotubes are effectively trapped by the convex-concave structure. If the considerably diluted high-viscosity dispersing liquid is used, the carbon nanotubes can be deposited through repeated collision and high electric conductivity can be given to them as in the use of a high-density, high-viscosity dispersing liquid.

Figure 6A:
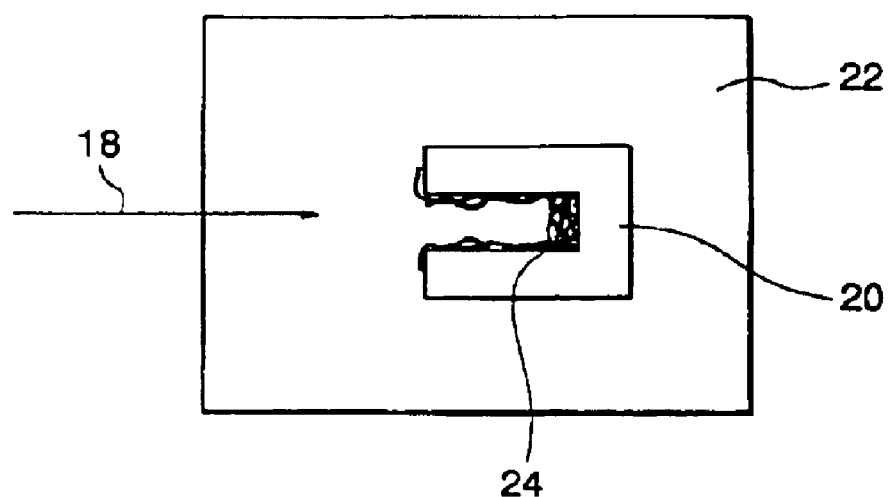
FIG. 6A and FIG. 6B are schematic views showing examples of the concave-shaped parts on the planar board, FIG. 6A being an example of using a U-shaped part instead of the concave-shaped part and FIG. 6B being an example of using a two-parallel-line-shaped part instead of the convex-shaped part.
Figure 6B:
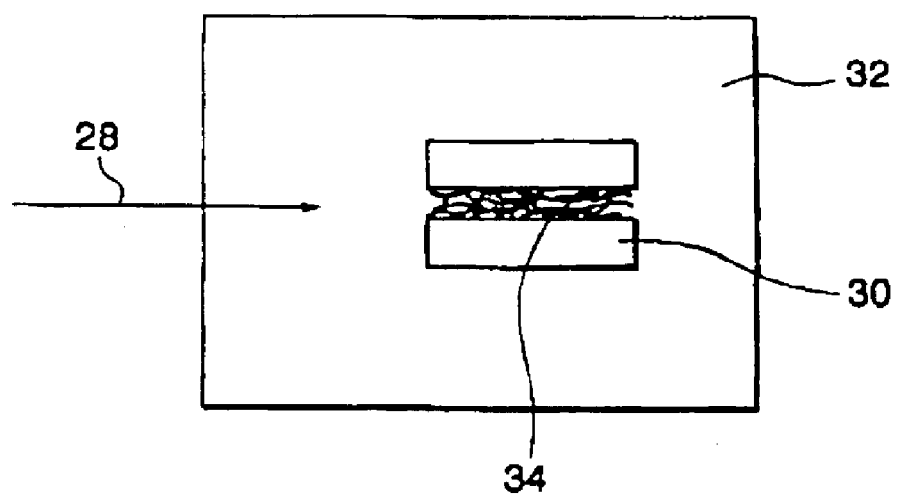

The convex and concave parts can be intentionally formed into the shapes, in which the carbon nanotubes are trapped. For example, as shown in FIG. 6A, if U-shaped convex parts 20 are formed, at the inner sites of the U-shaped portions of the convex parts 20, the carbon nanotubes 24 are trapped and the carbon nanotube structure can be formed, when the high-viscosity solution containing the network of the carbon nanotubes 24 is dipped onto the planar board from the direction indicated by an arrow 18. Furthermore, as shown in FIG. 6B, if the parallel-line-shaped convex parts 30 are formed, when the high-viscosity solution containing the network of the carbon nanotubes 34 is dipped from the direction indicated by an arrow 28, the flow rate of the carbon nanotubes is lower, the carbon nanotubes 34 are trapped there, and the carbon nanotube structure can be formed. The application of this effect enables electronic devices, in which the carbon nanotubes are used for wiring, to be manufactured.

In addition, if the concave or convex structure is formed on the planar board, the carbon nanotubes are trapped in the concave parts themselves or the concave parts formed between the convex parts and they are protected by the adjacent convex parts. For this reason, if they are rubbed or scrabbled for some cause, the whole carbon nanotube structure is not destroyed, achieving a high value for industrial use.

Thus, the concave parts themselves or the concave parts formed between the convex parts on the planar board can be used for the channel structure, through which high-viscosity dispersion medium passes, and the conductive channel can be formed only at the portion, through which the high-viscosity dispersion medium passes.

Note that if the concave or convex parts are formed on the planar board, by soaking only the convex parts themselves or the convex parts formed between concave parts in the high-viscosity dispersing liquid, that is by stamping, these convex parts can be used as the trapping sites. In this case, the carbon nanotubes are fixed to the convex parts. (2) By Patterning the Surface of the Planar Board so that the Parts of it Have Different Lyophilic Properties to the Dispersion Medium, the Channel Structure is Formed.

By patterning the surface of the planar board so that the parts of it have different lyophilic properties to the dispersion medium and dipping the high-viscosity dispersing liquid on the board, the carbon nanotubes in the high-viscosity dispersing liquid are prone to be retained at the parts with higher lyophilic properties of the planar board while they are not prone to be retained at the parts with lower lyophilic properties of the planar board. Here, the "lyophilic to the dispersion medium" indicates an affinity with the dispersion medium. If the dispersion medium is water, it shows hydrophilicity. In other words, if the some water-soluble medium is used as the dispersion medium, by patterning the surface of the planar board into hydrophilic parts and hydrophobic parts, the desired shape of carbon nanotube structure can be formed.

The lyophilic properties can be adjusted as follows: for example, the planar board with high lyophilic properties is patterned so that it has low lyophilic properties to the dispersion medium or the planar board with low lyophilic properties is patterned do that it has high lyophilic properties. Of course, both the treatments can be applied. With respect to these treatment methods, there is especially no limitation and all the conventionally known water-repellent and hydrophobic treatment can be used with no problem. For example, if a water-soluble medium is used as the dispersion medium, well-known water-repellent treatment and lyophilic treatment can be applied without any problem.

In this example, generally, the carbon nanotube structure is formed at the part with high lyophilic properties while no carbon nanotube structure is formed at the part with low lyophilic properties. Note that if the space with low lyophilic properties between the parts with high lyophilic properties is shorter than the length of the carbon nanotubes or the length of the carbon nanotube bundle, the carbon nanotube structure also can be formed at the part with low lyophilic properties between the parts with high lyophilic properties through interaction by the part with high lyophilic properties.

For the trapping sites, the planar board, on which particulate and/or film metal has been arranged, may be used. When the high-viscosity dispersing liquid is dipped on the board on which particulate metal has been arranged, the carbon nanotubes collide against the particulate metal parts and get stick to them. On the other hand, when the high-viscosity dispersing liquid is dipped on the board on which film metal parts has been arranged, the carbon nanotubes in the high-viscosity dispersing liquid are prone to be retained at the film metal parts of the board surface because of their higher lyophilic properties (especially, hydrophilicity) if the parts of the board surface other than the parts on which film metal has been arranged, have lower lyophilic properties. For this reason, it can be said that the former is a variant of the embodiment (1) mentioned before while the latter is a variant of the embodiment (2), respectively.

Furthermore, by increasing the lyophilic properties of the parts of the board surface other than the parts, on which the metal has been arranged, the carbon nanotube structure can be formed on the whole surface of the planar board. On the resulting planar board, the electrical and/or magnetic connections can be established by the carbon nanotube network at the gaps between the patterned metal particles, patterned metal thin films, and between the metal particles and the metal thin films.

At that time, for example, by making the sizes of the metal concave-convex structure and setting the distribution density to a higher value, the resulting compound made of the carbon nanotubes and the metal indicates a high electric and/or magnetic conductivity, even if the same carbon nanotube structure is used. If the size is small or the distribution density is low, the compound indicates a low electric conductivity.

Figure 7A:
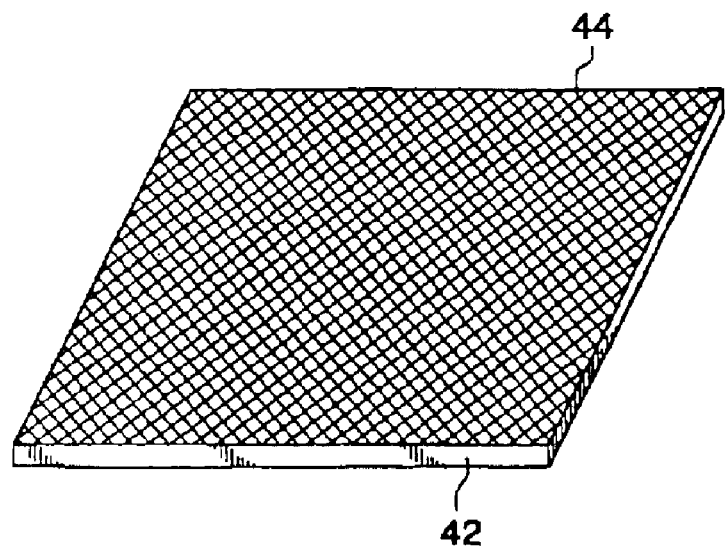
FIG. 7A and FIG. 7B are perspective views showing conditions, in which a metal film covers a whole surface of the planar board and FIG. 7B, a pattern of strips being drawn on the planar board.
Figure 7B:
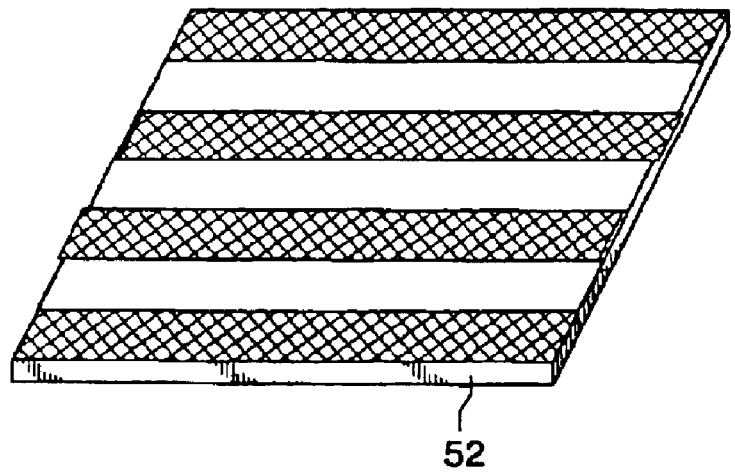

FIG. 7A shows the metal film 44 has been formed on the whole surface (one side) of the planar board 42 and FIG. 7B shows strips of the metal film 54 have been formed on the surface (one side) of the planar board 52.

Note that although there is especially no limitation for the metal to be used, for example, the metals with high electric conductivity such as gold, silver, copper, platinum, nickel, aluminum, titanium, and alloys of them may be used for electric wiring and silicon and germanium, which indicate high electric conductivity when doped, may be used for semiconductors. In addition, the molecular crystals, electric conductive polymers, or charge transfer complexes and those, in which impurities have been doped, may be used.

So far, the method of manufacturing the carbon nanotube structures focusing on the embodiments, in which the carbon nanotube structures are formed at given trapping sites. As mentioned before, in the invention, the dispersion medium may be removed while the high-viscosity dispersing liquid is in contact with the sites, to which no carbon nanotubes fixed (hereafter, in some cases, simply referred to as "non-fixed sites"). In this case, the carbon nanotube structures are only located on the non-fixed sites instead fixing to them. For this reason, the units of the carbon nanotube structures can be attained without fixing to the board and the like.

It is sufficient that the non-fixed sites have less affinity with the dispersion medium. If a water-soluble medium is used for the dispersion medium, the surface of the board must be treated so that it indicates hydrophobicity. To make the surface of the board hydrophobic, the water-repellent treatment may be simply applied to it.

<Carbon Nanotube Structures>

The carbon nanotube structures manufactured by the method of manufacturing the carbon nanotube structures mentioned above are described including the carbon nanotube devices, which are applicable embodiments.

First of all, the method of preparing the high-viscosity dispersing liquid W used in the embodiments described below.

A water solution, which is prepared by adding 0.01 g of dodecyl sodium sulfate in 10 ml of water is used as the dispersion medium and the carbon nanotubes are added little by little while the dispersion medium is stirring in an ultrasonic distributor (output 11W). For the carbon nanotubes, SWNTs with 4 nm of thickness and 5 $\mu$m of average length are used.

The viscosity of the liquid becomes higher as the amount of the added carbon nanotubes increases. At the density of the carbon nanotubes corresponding to the critical point X shown in FIG. 1, the viscosity of the liquid rapidly increases. This is verified by measuring the viscosity of the liquid in a bath at constant temperature of 20° C. using an Ubbelohde viscometer (the rate of the liquid flowing through capillary columns).

While stirring is continued, the carbon nanotubes are further added until the density of the carbon nanotubes reaches 2 g/liter. In this way, the high-viscosity dispersing liquid W with about 2 mPa?2s of viscosity is prepared.

(First Embodiment)

Figure 8:
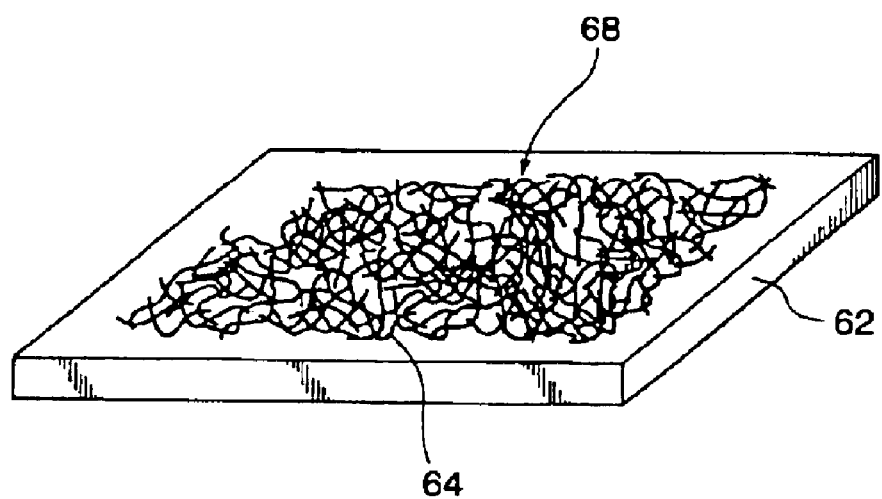
FIG. 8 is a schematic perspective view showing a first embodiment of the carbon nanotube structure of the prevent invention.
Figure 9:
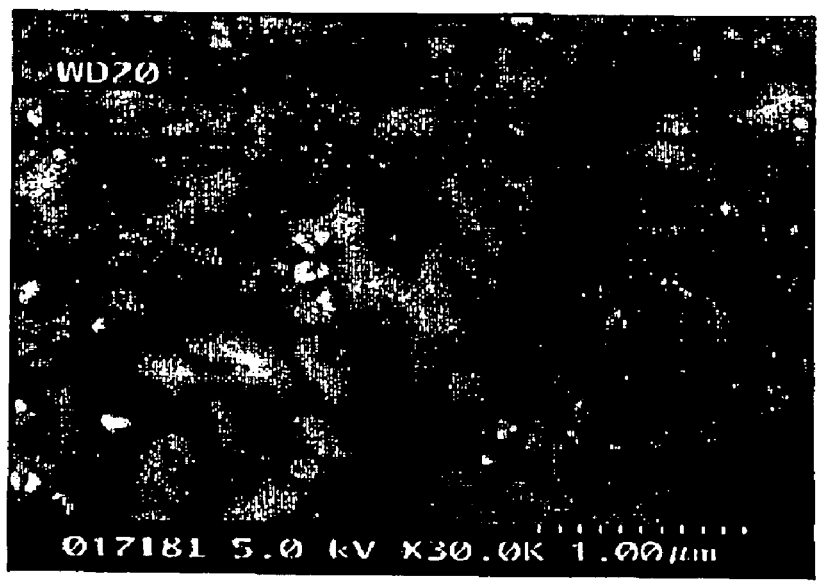
FIG. 9 is an electronic microscopic picture (magnified by a factor of 3000) showing the carbon nanotube structure shown in FIG. 8.

FIG. 8 is a schematic perspective view showing a first embodiment of the carbon nanotube structure of the invention. A carbon nanotube structure 68 made of the carbon nanotubes 64 is fixed on almost the whole surface of a planar board 62. The carbon nanotubes 64 with several $\mu$m to several-ten $\mu$m in length are in contact with each other to form an electric conductive network. For this reason, conductivity is attained on the surface of the planar board 62. FIG. 9 is an electronic microscopic picture (magnified by a factor of 30000) showing the carbon nanotube structures 68, which is an embodiment of the invention. Note that some error has occurred in the magnification of the picture because of its large scale.

The carbon nanotube structures 68, which is an embodiment of the invention, can be attained by applying the high-viscosity dispersion medium W to the surface of the planar board 62 by spin coating and drying it.

If any of transparent materials such as glass sheets, mica sheets, or polymer sheets (for example, polyester, polystyrene or nylon) are used for the planar board 62, vary high transparency can be attained as a whole. The methods, by which electric conductivity is given on the surface of the board by carbon evaporation or metal evaporation, have been known. Compared with these methods, if the carbon nanotube structures 68 are used to make the surface of the planar board 62 conductive as indicated in the embodiment, very high light transmittance can be attained because the surface of the planar board has the gaps with no need for covering as a whole with the carbon nanotubes.

Thus, the carbon nanotube structures 68 of the embodiment can be used not only as the carbon nanotube devices such as electric conductive boards and electrodes but also as the carbon nanotube devices such as transparent electrodes and transparent boards.

In the embodiment, electric conductivity can be freely controlled and electric conductivity can be locally varied by controlling the amount of carbon nanotubes forming into a bundle (the thickness of the bundle) and the density of the networks (the branch density). For this reason, the carbon nanotube structures of the embodiment can be used not only for single devices such as LEDs but also for the devices, which are closely packed, such as displays, on the surfaces of which, various types of treatments are applied.

Further, in the embodiment, any objects other than the carbon nanotubes may be inserted at the gaps among at least some of the carbon nanotubes 64 in the network. By dispersing the objects other than the carbon nanotubes, the functions corresponding to that of the objects other than the carbon nanotubes to be added can be given to the carbon nanotube structure. The functions of the objects other than those of the carbon nanotubes include, for example, the function similar to that of spacers and the functions which are involved in electric and/or magnetic conductivity. For the objects using these functions, the objects mentioned as the "other objects" in the section <Method of manufacturing the carbon nanotubes>can be used with no change.

To insert the objects other than the carbon nanotubes, as mentioned in the section <Method of manufacturing the carbon nanotubes>, the other objects may be simply added in the high-viscosity dispersing liquid W. Alternately, the objects other than the carbon nanotubes may be arranged at the gaps among and/or in the vicinity of the carbon nanotubes using any of the methods (for example, 1) the method by which the materials are exposed an vapor, for example, by vacuum evaporation, 2) the method by which a solution containing the material intended to for example, dye solution is dropped, or the material is soaked into the solution, 3) the method by which the temperature is raised and dropped repeatedly to make fine cracks due to difference in expansion coefficients, allowing the other objects to enter into them, and 4) the method by which electrons, atoms, ions, molecules, or particles are accelerated and implanted) after the carbon nanotube structures have been formed.

When the electrical conductivity of the carbon nanotube structures 68 is directly observed through a current detection SPM with a probe coated with metal (scanning probe microscope), electric conductivity working in the whole carbon nanotube structures 68 of the invention can be verified. Further, electric conductivity of larger area than that of the network structure verifiable by an SEM can be verified.

Figure 10:
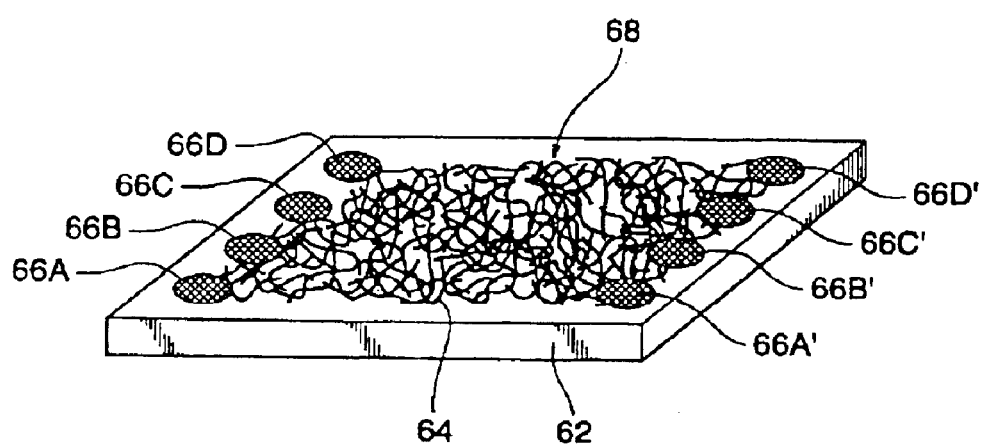
FIG. 10 is a schematic perspective view showing an example of mounting carbon nanotube devices.

Furthermore, FIG. 10 shows an example of the carbon nanotube devices using the carbon nanotube structure 68 of the invention. The carbon nanotube devices shown in FIG. 10 are made by attaching input terminals 66A to 66D and output terminals 66A' to 66D' at the ends of the same carbon nanotube structure 68 as that shown in FIG. 8.

The carbon nanotube devices of the embodiment can be used for multi-branch devices, in which the input into any of the input terminals 66A to 66D is multi-branched and output from four output terminals 66A' to 66D'.

When values for electric conductivity are examined between the input terminals 66A to 66D and the output terminals 66A' to 66D' by increasing the electrodes on the both sides, initially no difference is found. When a voltage (5V) is applied only to a certain pair of input/output terminals (66B and 66C') ten times, the current values for the pair of input/output terminals are increased. Since no difference is observed in other pairs of input/output terminals, the carbon nanotube network mainly involved in the electric conduction for the certain pair of input/output terminals is certified.

Second, when a voltage (10V) is applied only to a certain pair of input terminals (66B and 66C') ten times, the current values for the pair of input terminals is decreased. At that time, an increase in the current values for the other pairs of input terminals (66C and 66A') can be verified. An interaction is observed between the carbon nanotube network mainly involved in electric conduction of the certain pair of input/output terminals and the carbon nanotube network mainly involved in electric conduction of the other pair of input terminals.

By applying the carbon nanotube devices of the embodiment, a learning function can be attained in multi-channel input and output devices.

Note that by integrating other objects having the functionality mentioned before or by reforming contact parts among the carbon nanotubes each other, input signals can be variously modulated. Alternately, by applying a magnetic field from one or both of the sides of the planar board 62, the input signals can be modulated.

(Second Embodiment)

FIG. 11 is a schematic plan view showing the second embodiment of the carbon nanotube structure of the invention. On a surface of a given planar board 72, a carbon nanotube structure 78 made of carbon nanotubes 74 is fixed. In the embodiment, the carbon nanotube structure 78 in which the carbon nanotubes 74 are arranged along the desired patterning, is formed.

The carbon nanotube structure 78 of the embodiment can be manufactured as follows.

Figure 11A:
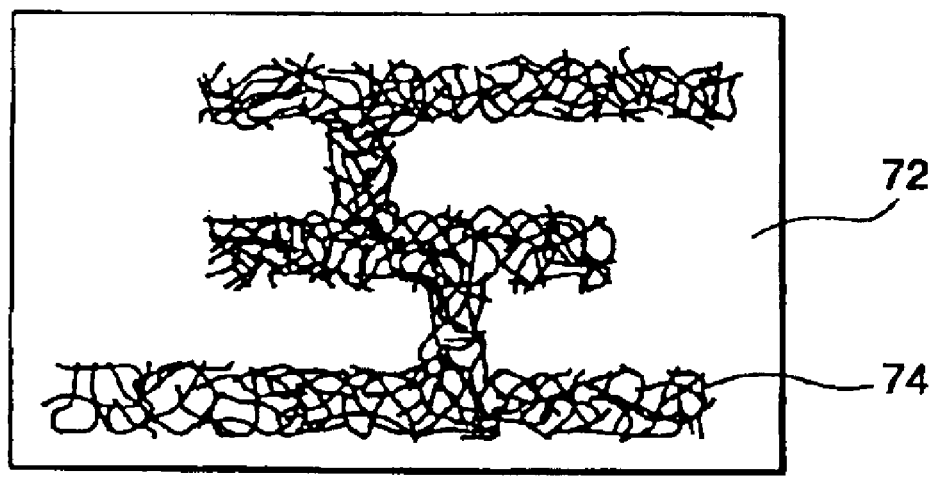
FIG. 11A and FIG. 11B are views explaining a second embodiment of the carbon nanotube structure of the present invention, FIG. 11A being a schematic plan view showing a second embodiment of the carbon nanotube structure of the present invention and FIG. 11B being a schematic plan view showing the patterning formed on the planar board to manufacture the carbon nanotube structure shown in FIG. 11A.
Figure 11B:
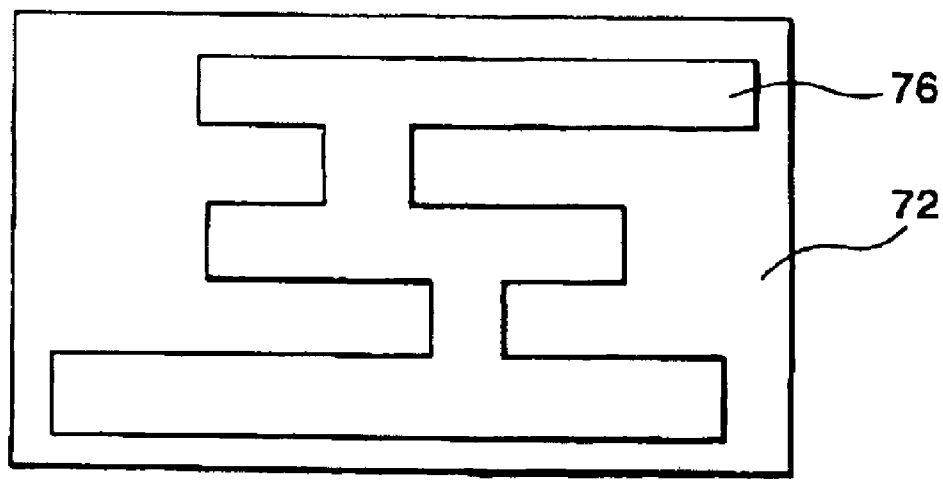

Using any of materials such as glass sheets and mica sheets, a hydrophobic surface is formed by applying the water-repellent treatment at the parts other than the patterning 76 on the surface of the planar board 72 to achieve the patterning 76 as shown in FIG. 11B. Then, only the patterning part 76 has hydrophobicity. Note that in the embodiment, using a silane coupling agent, the water-repellent treatment is applied.

Using the high-viscosity dispersing liquid W, in which a water-soluble medium is used for the dispersion medium and by dipping it on the planar board patterned shown in FIG. 11B, the carbon nanotubes 74 fix only to the patterning 76 of which the surface is hydrophobic, and the carbon nanotube structure 78 of a shape shown in FIG. 11A is manufactured.

Like the first embodiment, in the second embodiment, the objects other than the carbon nanotubes may be inserted in the carbon nanotube structure 78 or plural terminals may be attached.

Thus, according to the embodiment, the carbon nanotube structure, which is patterned into the desired shape, can be formed on the surface of the planar board and can be used as a wiring part and a device by adding the function mentioned above to the carbon nanotube structure itself.

(Third Embodiment)

Figure 12A:
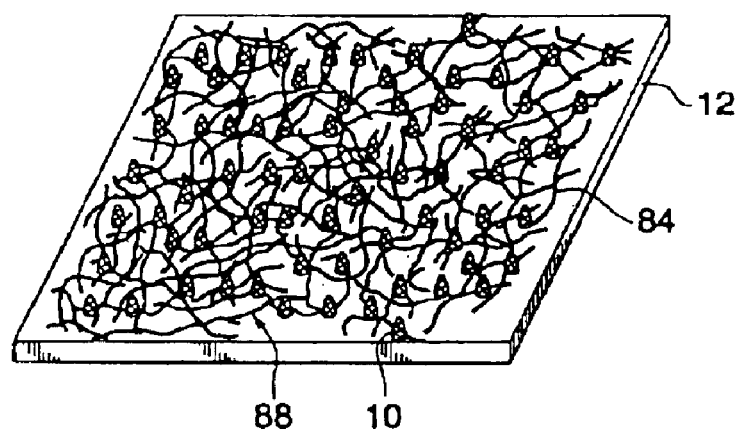
FIG. 12 is a schematic perspective view showing a third embodiment of the carbon nanotube structure of the present.

FIG. 12 is a schematic perspective view showing the third embodiment of the carbon nanotube structure of the invention. In the figure, convex parts 10 made of gold fine particles formed on the given planar board 12 are bound on the carbon nanotube structure 88 made of the carbon nanotubes 84.

In the third embodiment, first the convex parts 10 made of gold fine particles are formed on the planar board 12 as shown in FIG. 4A. Specifically, the convex parts 10 distributed like islands are formed by evaporating 20 nm of gold on the surface of the glass sheet, which is the planar board 12 and heating it. By spin-coating the high-viscosity dispersion medium to linked among and cover the whole gold fine particles like islands, the carbon nanotube structure 88 is formed.

In the embodiment, the convex parts 10 of gold fine particles like islands which are separated from each other, are electrically connected by the carbon nanotube structure 88.

(Fourth Embodiment)

Figure 13:
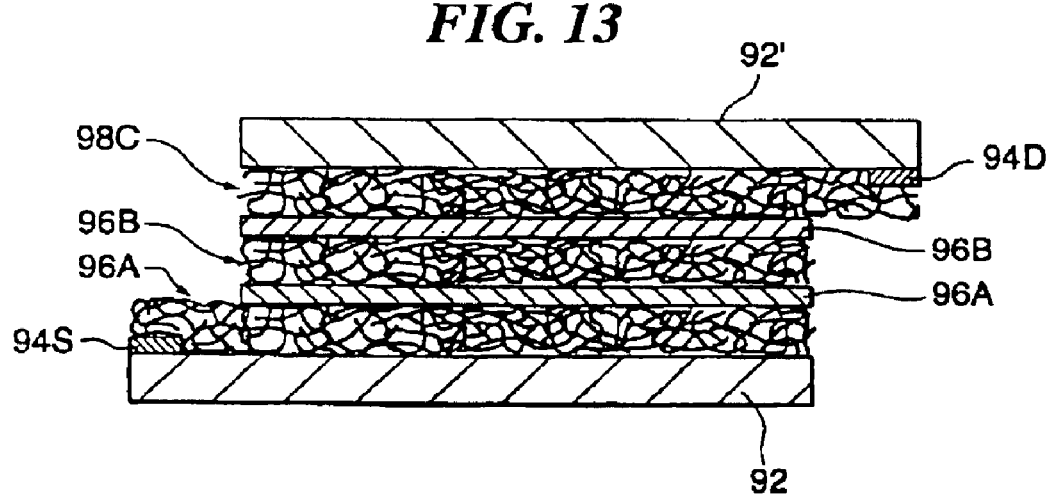
FIG. 13 is a schematic perspective view showing a fourth embodiment of the carbon nanotube structure of the present invention.

FIG. 13 is a schematic sectional view showing the fourth embodiment of the carbon nanotubes of the invention. With respect to the carbon nanotube structure of the embodiment, on the surface of insulated planar board 92, a carbon nanotube structure layer 98A similar to that of the first embodiment, a copper phthalocyanine evaporated layer 96A (0.1 $\mu$m), the carbon nanotube structure layer 98B, a copper phthalocyanine evaporated layer 96B (0.1 $\mu$m), and a carbon nanotube structure layer 98C similar to that of the first embodiment are formed in that order.

The carbon nanotube structure of the embodiment is manufactured as follows.

On an insulated planar board 92 made of glass, one side of which a metal electrode 94S is disposed, a carbon nanotube structure layer 98A in the same manner as that for the first embodiment. In addition, on it, the copper phthalocyanine evaporated layer 96A by evaporating copper phthalocyanine, the carbon nanotube structure layer 98B in the same manner as that for the first embodiment, the copper phthalocyanine evaporated layer 96B, and a carbon nanotube structure layer 98C similar to that of the first embodiment are formed in that order. The insulated planar board 92 made of glass, on one side of which a metal electrode 94S is disposed, is overlapped on the carbon nanotube structure 98C with the metal electrode 94S oppositely faced to the metal electrode 94D (5 mm distant each other) to manufacture a laminated structure made of the carbon nanotube structure layers and the phthalocyanine evaporated layers.

The resultant laminated structure has conductivity lower (1 MΩ/m) than that of three-layer carbon nanotube structure with no phthalocyanine contained (0.001 Ω/m) and electric conductivity of the carbon nanotube structures contained in different nanotube structure layers can be verified.

Figure 14:
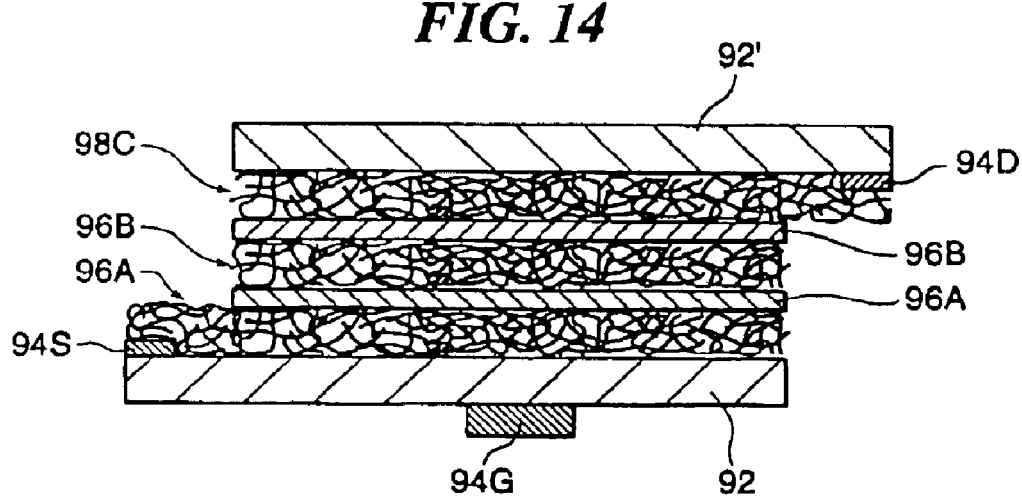
FIG. 14 is a schematic enlarged perspective view showing an example of mounting the carbon nanotube devices adopting the carbon nanotube structures shown in FIG. 13.

Furthermore, as shown in FIG. 14, a silicone wafer is used instead of the insulated planar board 92 made of glass to manufacture the similar laminated structure. In addition, the carbon nanotube device is manufactured by attaching a gate electrode 94G on the board side on the resultant laminated structure. By applying a voltage to the gate electrode 94G and measuring source drain current flowing across the metal electrodes 95S and 94D, the behavior as a field effect transistor is verified. The device has a semiconductor characteristic because of its phthalocyanine layers and by applying a voltage, an increase in conductance is confirmed.

(Fifth Embodiment)

Figure 15:
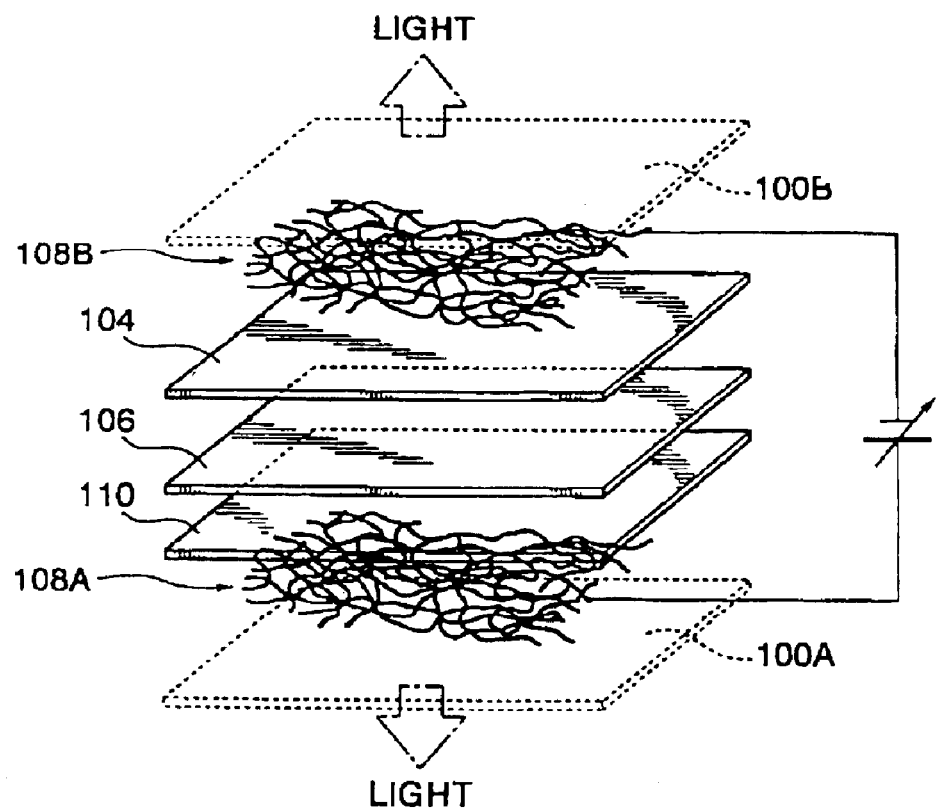
FIG. 15 is a schematic enlarged perspective view showing a fifth embodiment of mounting the carbon nanotube devices of the present invention.

FIG. 15 is a schematic enlarged perspective view showing the fifth embodiment of the carbon nanotube device of the invention. The carbon nanotube device of the embodiment is manufactured by the carbon nanotube structure 108A similar to that of the first embodiment, a electron transport layer 110 (0.2 $\mu$m), a light emission layer 106 (0.05 $\mu$m), a hole transport layer 104 (0.2 $\mu$m), a carbon nanotube structure layer 108B similar to the of the first embodiment, and a second transparent board 100B (500 $\mu$m) are formed on a surface of a first transparent board 100A (500 $\mu$m) in that order. The carbon nanotube device of the embodiment indicates the function of a laminated diode.

Silica glass is used for the first and second transparent boards 100A and 100B. Note that in the invention, there is no special limitation and the transparent boards made of various materials such as soda glass, quartz glass, sapphire, mica, and polyacryl plate may be used.

With respect to the electron transport layer 110, a thin film is formed by spin-coating an oxadiazol (PBD) solution. Note that in the invention, there is no special limitation and the electron transport layers made of various materials used for the electron transport layers in such fields, as electrophotography, diode element, LED element, EL element, and transistor element may be used.

With respect to the light emission layer 106, a film is formed by spin-coating a tris (8-hydroxyquinolinora-aluminum complex (A1Q3)) solution. Note that in the invention, there is no special limitation and the light emission layers made of various materials used for the light emission layers in such fields, as LED element, EL element, and semiconductor laser may be used.

With respect to the hole transport layer 104, a film is made by spin-coating N,N'-bis (3-methylphenyl), N,N'-diphenyl (1,1'-biphenyl), and 4,4'-diamine (TPD) solutions. Note that in the invention, there is no special limitation and the hole transport layers made of various materials used for the hole transport layers in fields regarding electrophotography, diode element, LED element, EL element, and transistor element may be used.

When a voltage (10 V) is applied between the carbon nanotube structure layers 108A and 108B of the resultant carbon nanotube device, light is emitted from both the sides of the device.

A carbon nanotube device for comparison is made using commercially available transparent electrodes (ITO thin film made by magnetron spattering on a silica glass: 1.4×10$^{-4}$Ω?4 cm) instead of the first transparent board 100A and the carbon nanotube structure layer 108A, as well as the second transparent board 100B and the carbon nanotube structure layer 108B. With respect to the device for comparison, light is emitted by applying a voltage as well, although light emitted from the carbon nanotube device of the invention is brighter than that of the device for comparison, which proves that the carbon nanotube structure of the invention is useful as the transparent electrode.

(Sixth Embodiment)

Figure 16:
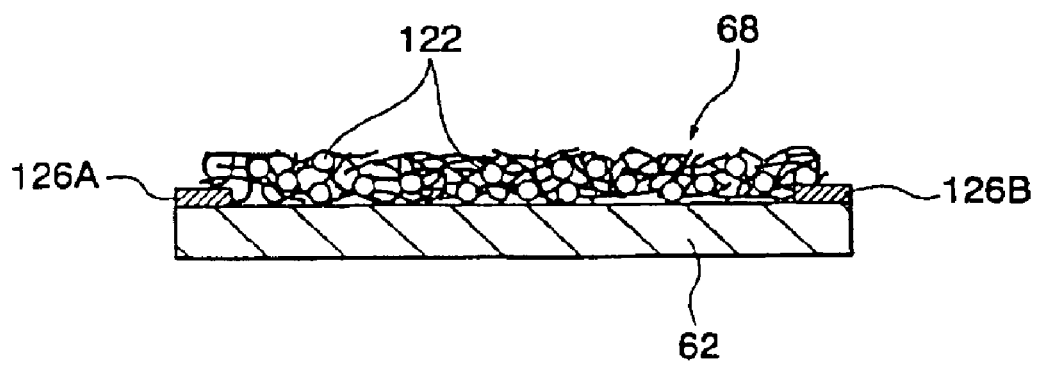
FIG. 16 is a schematic sectional view showing a sixth embodiment of mounting the carbon nanotube devices of the present invention.

FIG. 16 is a schematic sectional view showing the sixth embodiment of the carbon nanotube device of the invention. The carbon nanotube device is manufactured by attaching the terminals 126A and 126B to the carbon nanotube of the first embodiment and distributing light emitting molecules (the molecules emitting when a voltage is applied) 122 in the network of the carbon nanotube structure 68.

With respect to the carbon nanotube device of embodiment, the terminals 126A and 126B are attached to the construction of the carbon nanotube structure of the first embodiment and the light emitting molecules 122 are immersed in the carbon nanotube structure 68 by soaking the structure into a solution containing the following constituents, in which light emitting molecules are dispersed.

?bConstituents of solution?n
bCarbon tetrachloride: 100 ml
bToluene: 20 ml
bTris: (8-hydroxyquinolinora-aluminum complex (A1Q3)): 1 g With respect to the resulting carbon nanotube device, electric resistance of the carbon nanotube structure 68 is increased and when a voltage higher than the threshold voltage (5.5 V) is applied to the carbon nanotube structure 68, light is observed under an inverted fluorescence microscope. This suggests that the light emitting molecules 122 are inserted at the gaps among the carbon nanotubes 68 and the voltage applied to the carbon nanotube structure 68 is transmitted through the carbon nanotubes 64 disposed at the portions of the carbon nanotube structure 68 to the light emitting molecules 122. Thus, according to the carbon nanotube structure of the invention, the molecular element can be used for the carbon nanotube wiring.

(Seventh Embodiment)

Figure 17:
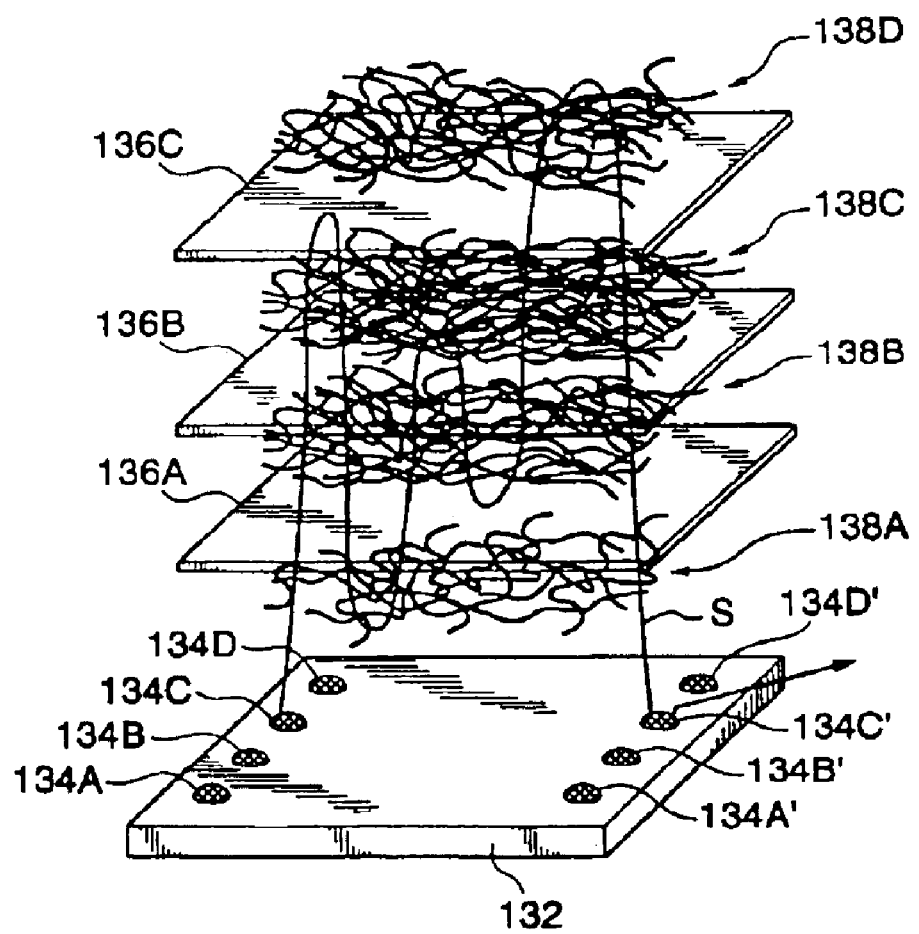
FIG. 17 is a schematic enlarged perspective view showing a seventh embodiment of the carbon nanotube structures of the present invention

FIG. 17 is a schematic, enlarged perspective view showing the seventh embodiment of the carbon nanotube device of the invention. The carbon device of the invention is manufactured by forming a carbon nanotube structure layer 138A, a first functional organic thin film layer 136A, a carbon nanotube structure layer 138B, a second functional organic thin film layer 136A, a carbon nanotube structure layer 138C, a third functional organic thin film 136C, and the carbon nanotube structure layer 138D on the planar board 132 at the ends of which the input terminals 134A to 134D and the output terminals 134A' to 134D' are attached in that order.

Each of the layers will be described below in detail.

Silica glass is used for the planar board 132.

With respect to the carbon nanotube structure layers 138A to 138D, the liquid, which is diluted by factors 3.5, 3, 2.5, and 2, is prepared by adding water to the high density liquid W (the density of the carbon nanotubes: 2 g/little) used as a concentrate solution and each of the 138A, 138B, 138C, and 138D layers is formed by spin coating using the various density of liquid prepared before in that order.

The first and second functional thin films 136A and 136B are formed by spin-coating to 0.2 $\mu$m of thickness using a solution, which is prepared by dissolving 1 mg of PMMA polymer in 10 ml of acetonitrile. Note that the planar board is heated to 120° C. after spin coating aiming at removal of acetonitrile, which is a residual medium, from the film layers and higher adhesiveness of the film layers to the carbon nanotube structure.

Note that when the current characteristics are compared between the device with only the first functional organic thin film layer (136A) and the device with the second layer (136B) added, an increase in the current values is observed in several pairs of input and output terminals. This suggests that the parts among the network is magnetically connected with each other through PMMA, as an organic functional layer and that a high-order network, which is partially broken, partially connected, and transmitted signals across multi-layers, can be formed instead of the network, which is simply connected as a whole.

By adding another functional organic thin film layer to the device, the third layer (the third functional organic thin film layer 136C) is formed as follows. Two grams of azobenzene is dissolved into 100 ml of monochlorobenzene and a thin film is formed by spin-coating. The thickness of the resulting thin film is about 100 nm or thinner. By further spin-coating, another 200 nm of film in total (the third layer (136C)) is formed.

By emitting a laser beam onto the carbon nanotube device of the embodiment, which is resulted from the addition of the third layer, from above (in the direction normal to the plane of the device) cis-trans substitution of azobenzene molecules is induced. The result shows that the current values for certain pairs of input and output channels are increased or decreased depending on the laser being on or off. When a laser is applied at another site, no difference in the current values for certain pairs of input and output channels is found. On the other hand, it is found that the current values for another pair of input and output channels are increased or decreased depending on a laser being on or off. This means that the device, which can control the current for any pair of input and output channels connected to the network when a stimulus is applied externally, is achieved.

According to the invention, the carbon nanotube structures, in which the networks, where electric and/or magnetic connections are established between the carbon nanotubes each other, have been formed into the desired area and volume, can be achieved and the method of manufacturing the carbon nanotube structures are easily manufactured with less carbon nanotubes can be provided. Further, according to the invention, the carbon nanotube devices using such useful carbon nanotube structures can be provided.

The entire disclosure of Japanese Patent Application No. 2001-150904 filed on May 21, 2001 including specification, claims, drawings and abstract is incorporated herein by reference in its entirety.

What is claimed is:

1. A device, which comprises two or more carbon nanotube structure layers comprising carbon nanotube structures in which a network is formed by plural carbon nanotubes intercrossed.

2. The device according to claim 1, wherein a functional layer is formed between at least two carbon nanotube structure layers.

3. The device according to claim 2, wherein the functional layer contains a functional object, and some carbon nanotubes contained in both the carbon nanotube structures facing with the functional layer therebetween are electrically and/or magnetically connected through the functional layer.

4. The device according to claim 1, wherein at least some of the carbon nanotube structures function as conductive wiring.

5. The device according to claim 1, wherein at least some of the carbon nanotube structures function as planar electrodes.

6. The device according to claim 1, wherein at least some of the carbon nanotube structures function as device circuits.

* * * * *